(12) United States Patent
Murphy et al.

(10) Patent No.: US 10,235,357 B2
(45) Date of Patent: Mar. 19, 2019

(54) COMMUNITY-BASED REPORTING AND ANALYSIS SYSTEM AND METHOD

(71) Applicant: Architecture Technology Corporation, Minneapolis, MN (US)

(72) Inventors: Andrew Murphy, Washington, DC (US); Eric Chartier, St. Louis Park, MN (US); Evan Eaves, Alexandria, VA (US); William Colligan, Vienna, VA (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 0 days.

(21) Appl. No.: 15/478,550

(22) Filed: Apr. 4, 2017

(65) Prior Publication Data

US 2018/0285340 A1    Oct. 4, 2018

(51) Int. Cl.
*G10L 15/22* (2006.01)
*G06F 17/27* (2006.01)
*G06F 17/30* (2006.01)

(52) U.S. Cl.
CPC ........ *G06F 17/278* (2013.01); *G06F 17/2725* (2013.01); *G06F 17/30011* (2013.01); *G06F 17/30707* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 2008/0059391 A1* | 3/2008 | Rosales | G06F 19/00 706/12 |
| 2008/0208864 A1* | 8/2008 | Cucerzan | G06F 17/278 |
| 2010/0287264 A1* | 11/2010 | Lopes | G06F 9/44505 709/221 |
| 2013/0346421 A1* | 12/2013 | Wang | G06F 17/30687 707/748 |
| 2018/0218284 A1* | 8/2018 | Jawahar | G06N 7/005 |

* cited by examiner

*Primary Examiner* — Shreyans A Patel

(57) ABSTRACT

A computer-implemented method for analyzing documents includes a processor receiving one or more documents, from a community-based document delivery system, related to a domain of interest; the processor identifying and extracting one or more data items from the one or more documents; determining if an identified and extracted data item comprises a true mention of a named entity; analyzing a context of the true mention of the named entity in the document; and determining, based on the analyzed context, if the document is a true document.

20 Claims, 23 Drawing Sheets

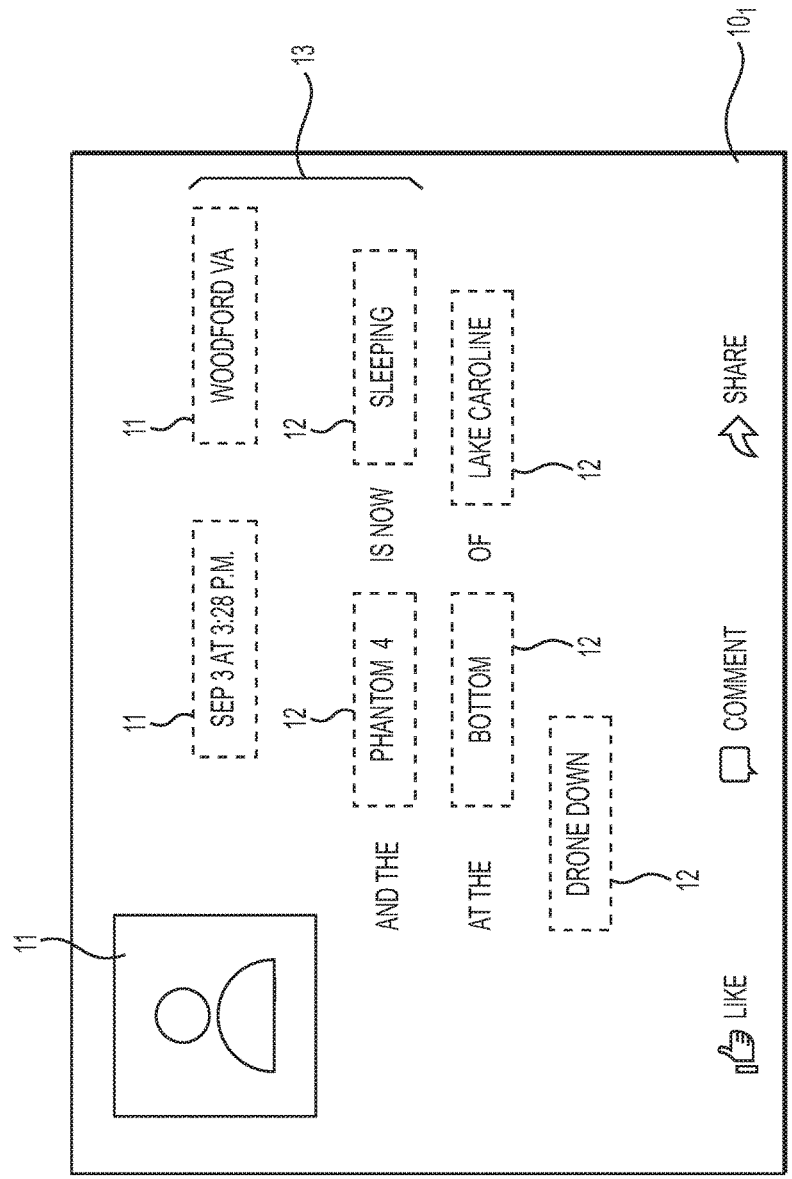
FIG. 1A(1)

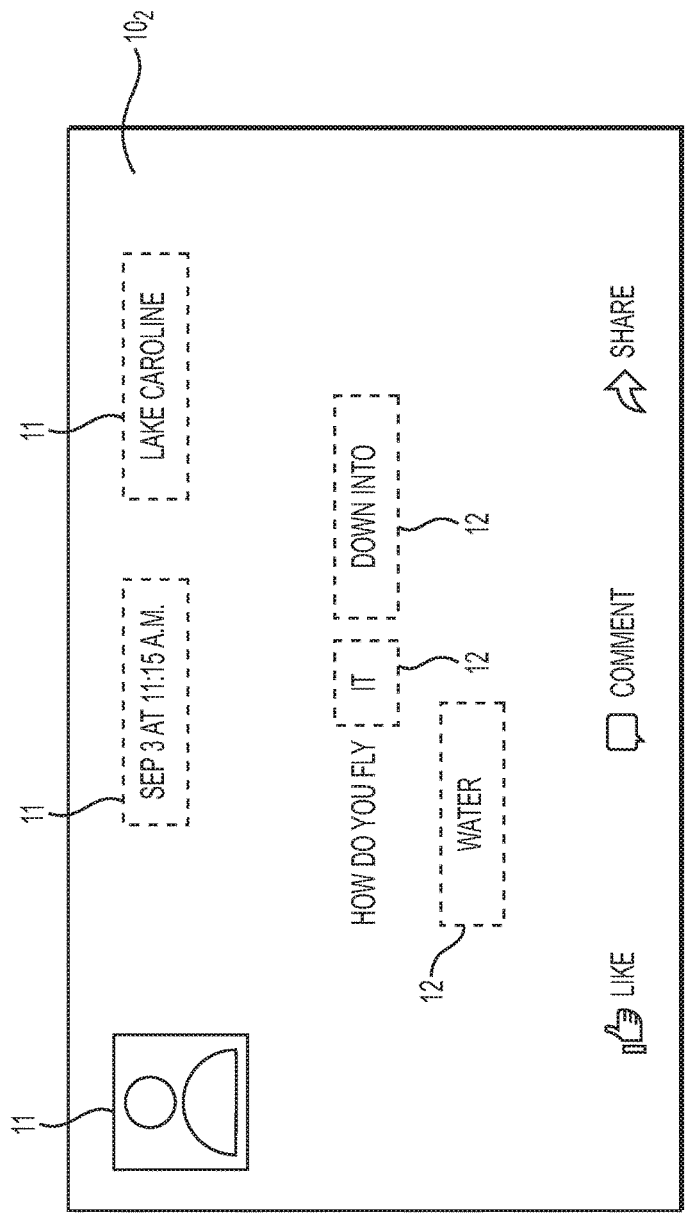
FIG. 1A(2)

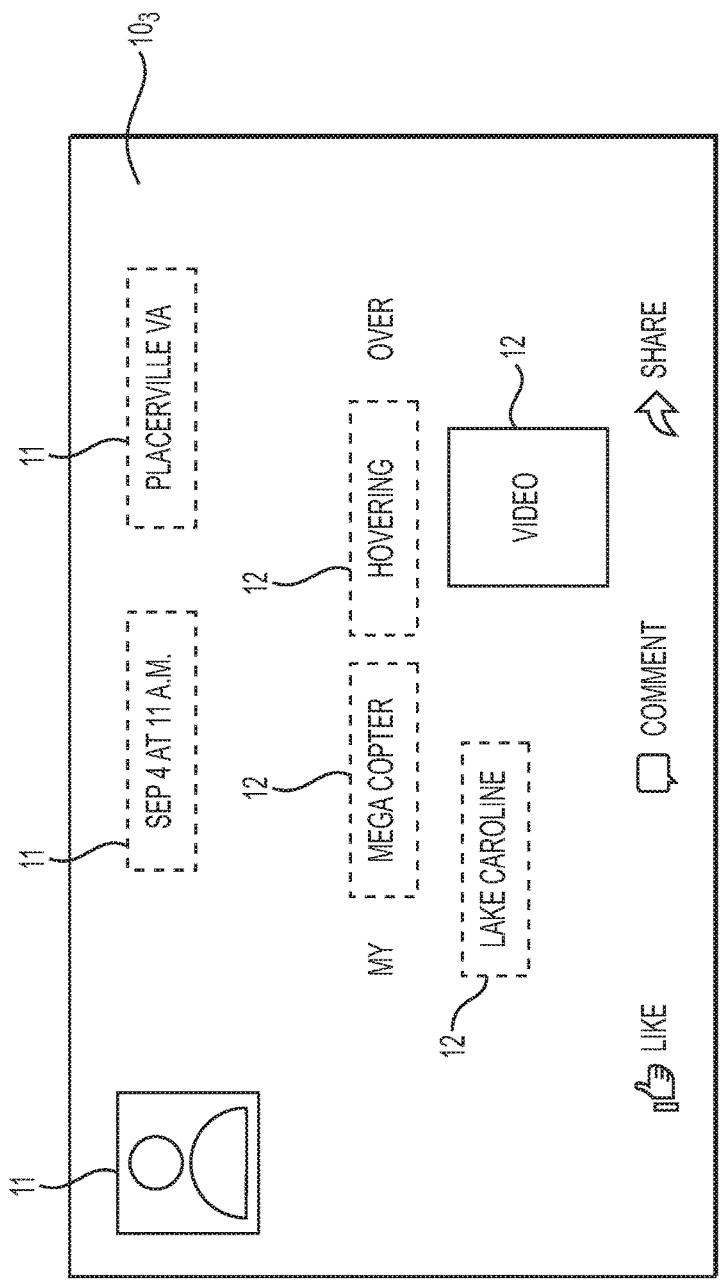
FIG. 1A(3)

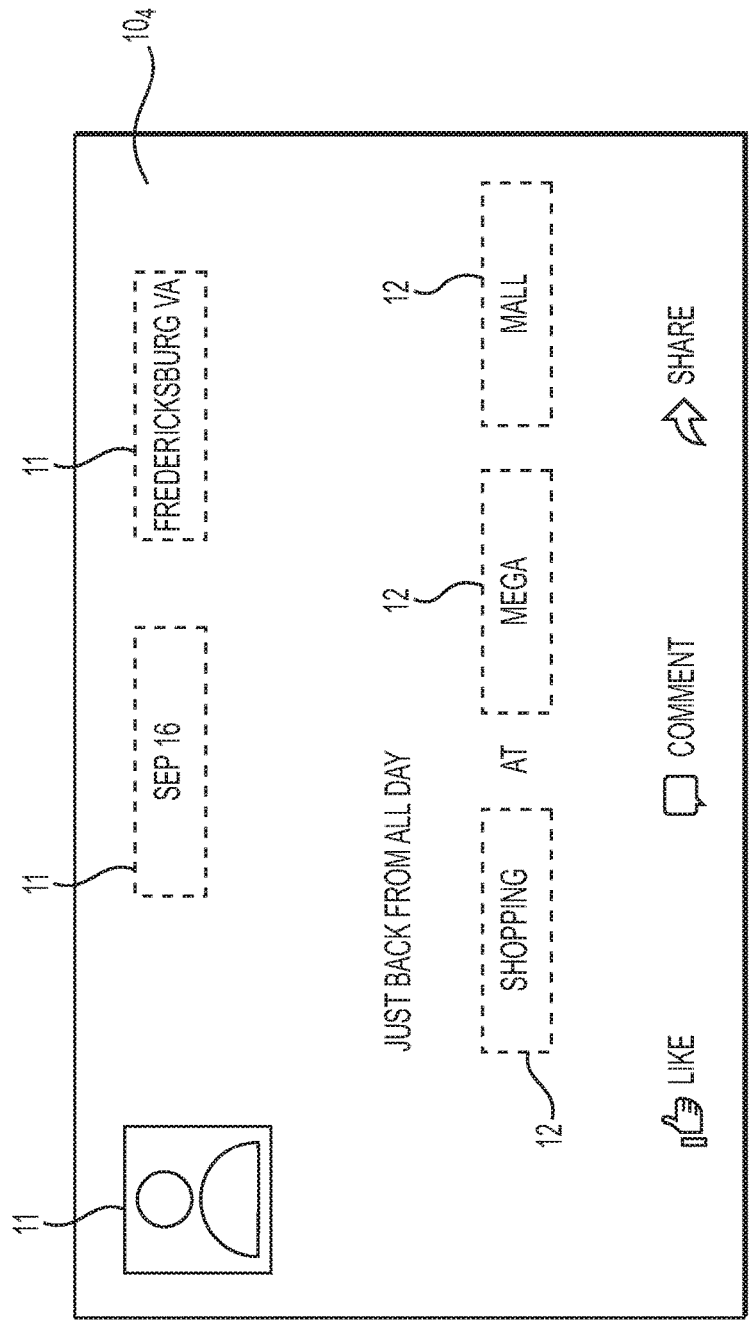
FIG. 1A(4)

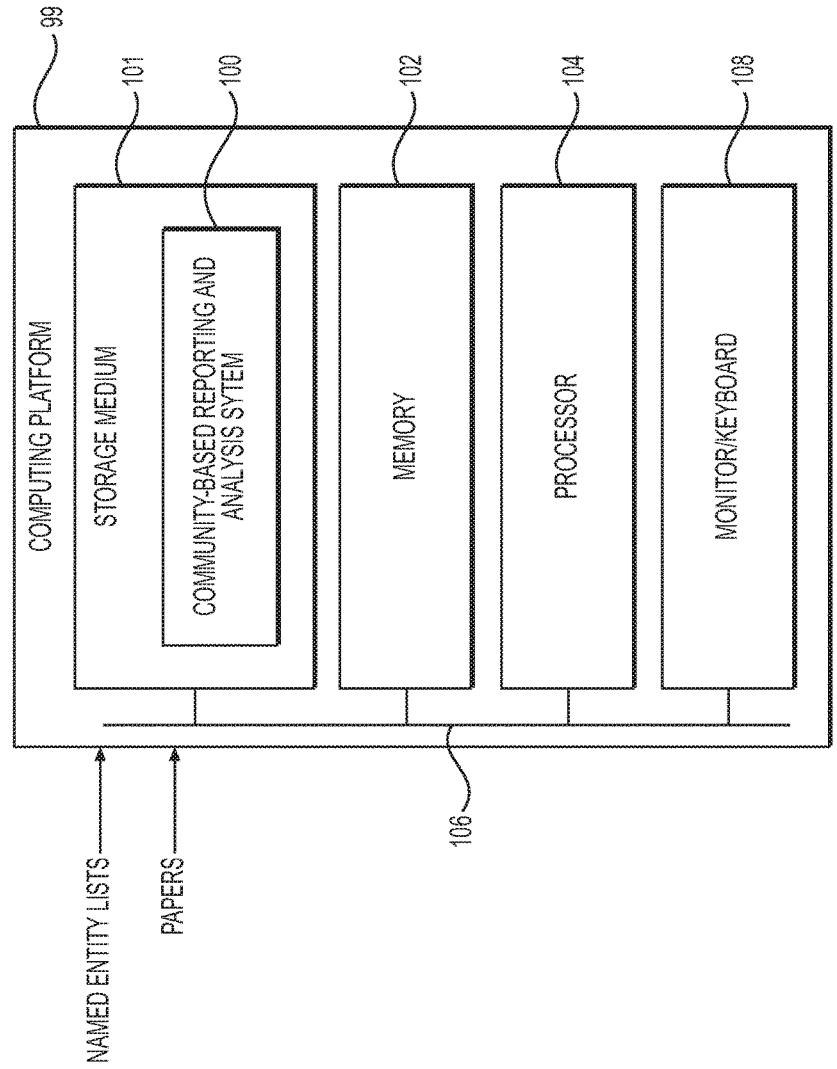
FIG. 2A(1)

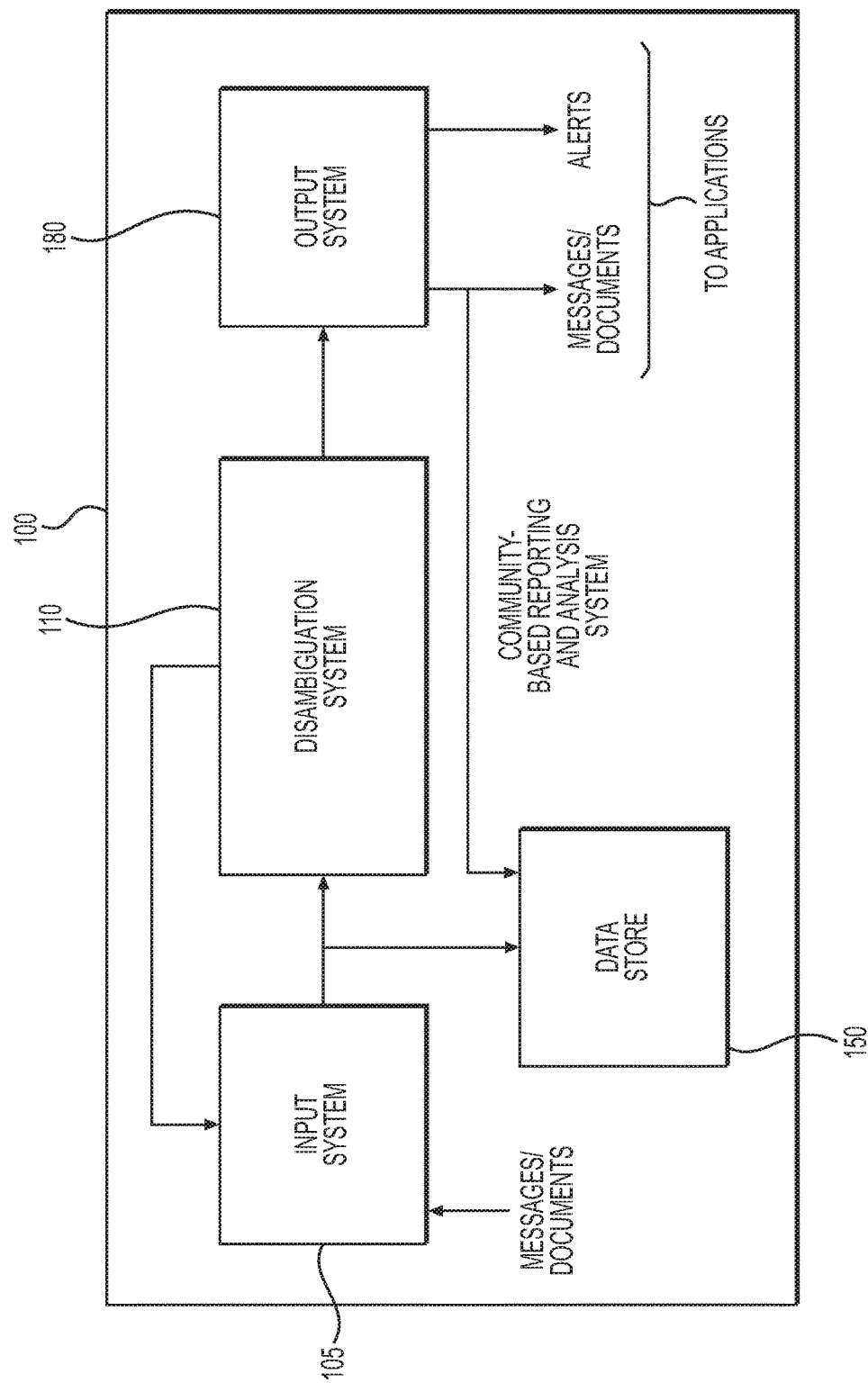
FIG. 2A(2)

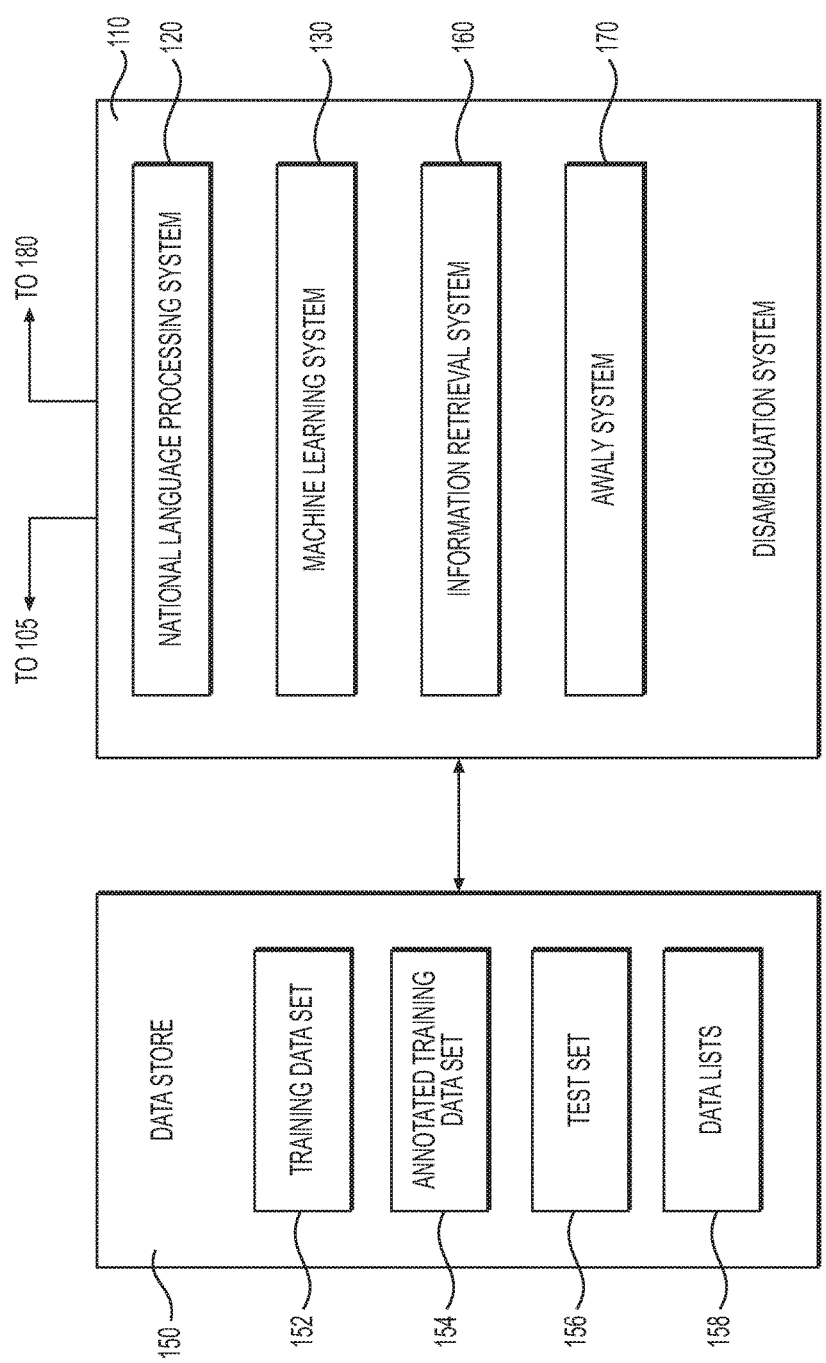
FIG. 2A(3)

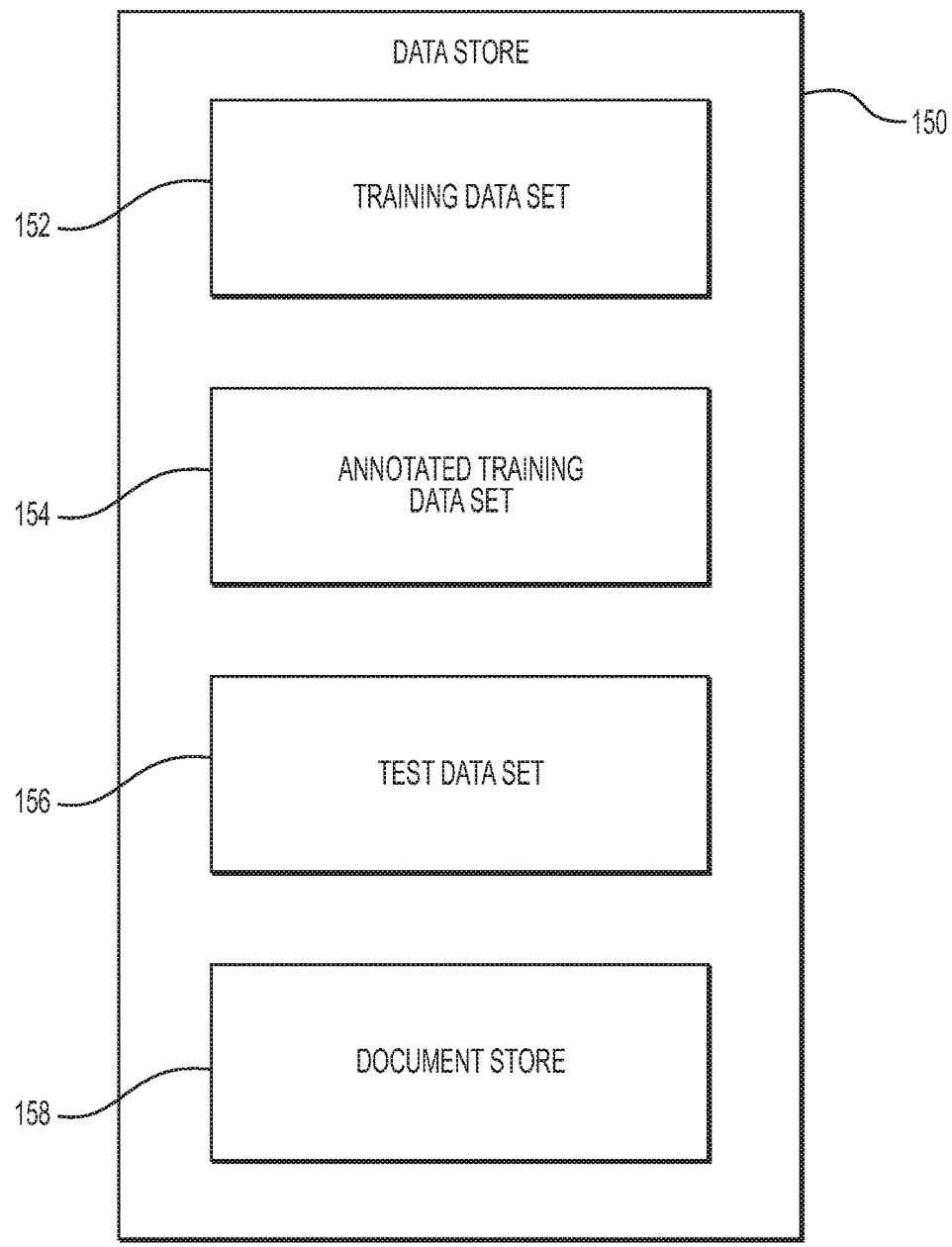
FIG. 2B(1)

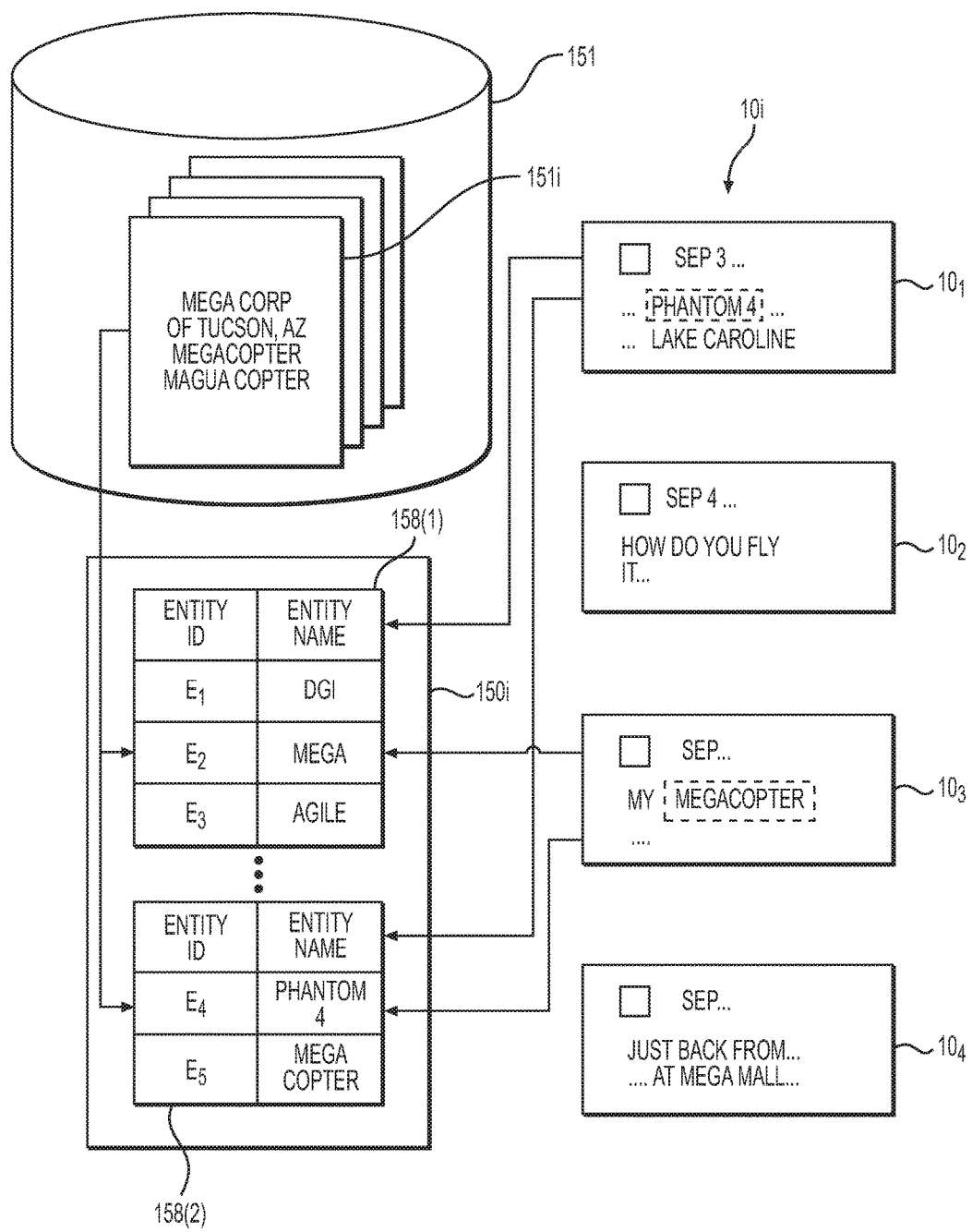
*FIG. 2B(2)*

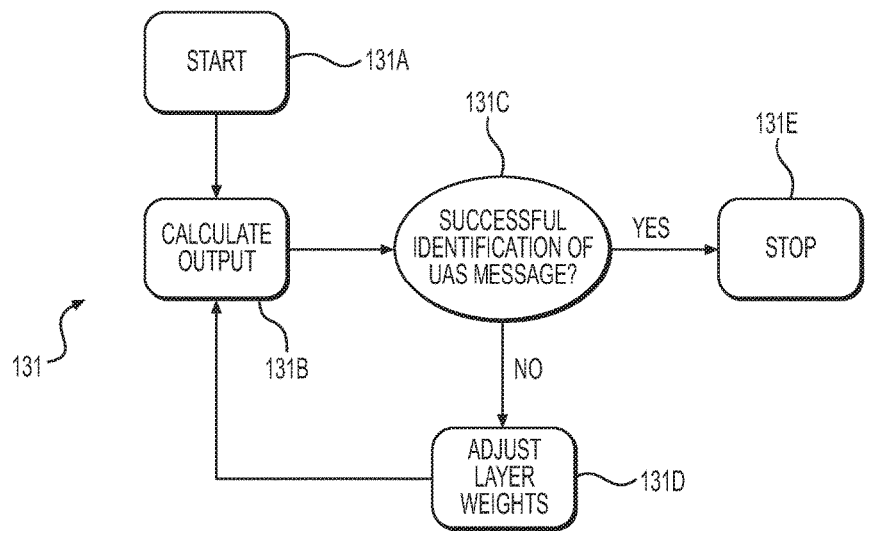
FIG. 2D(1)
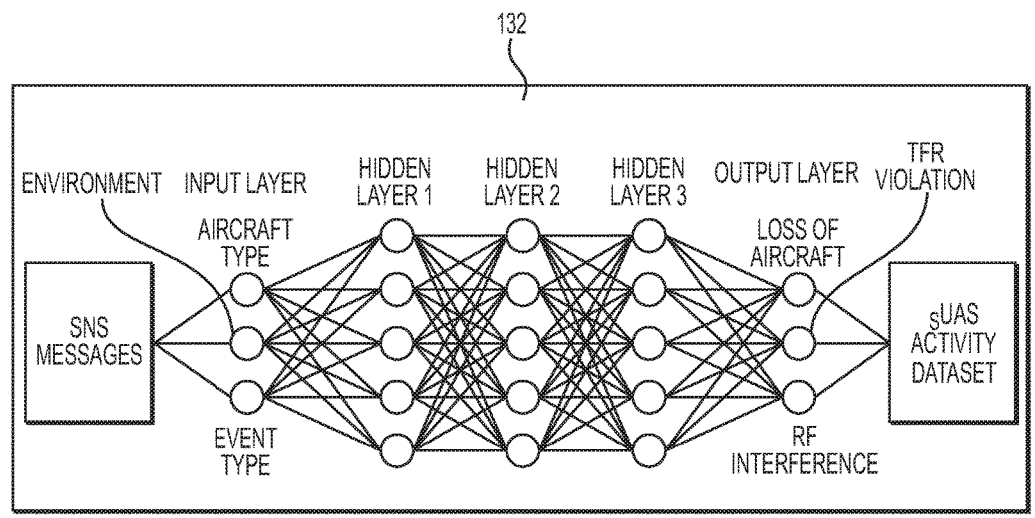
FIG. 2D(2)

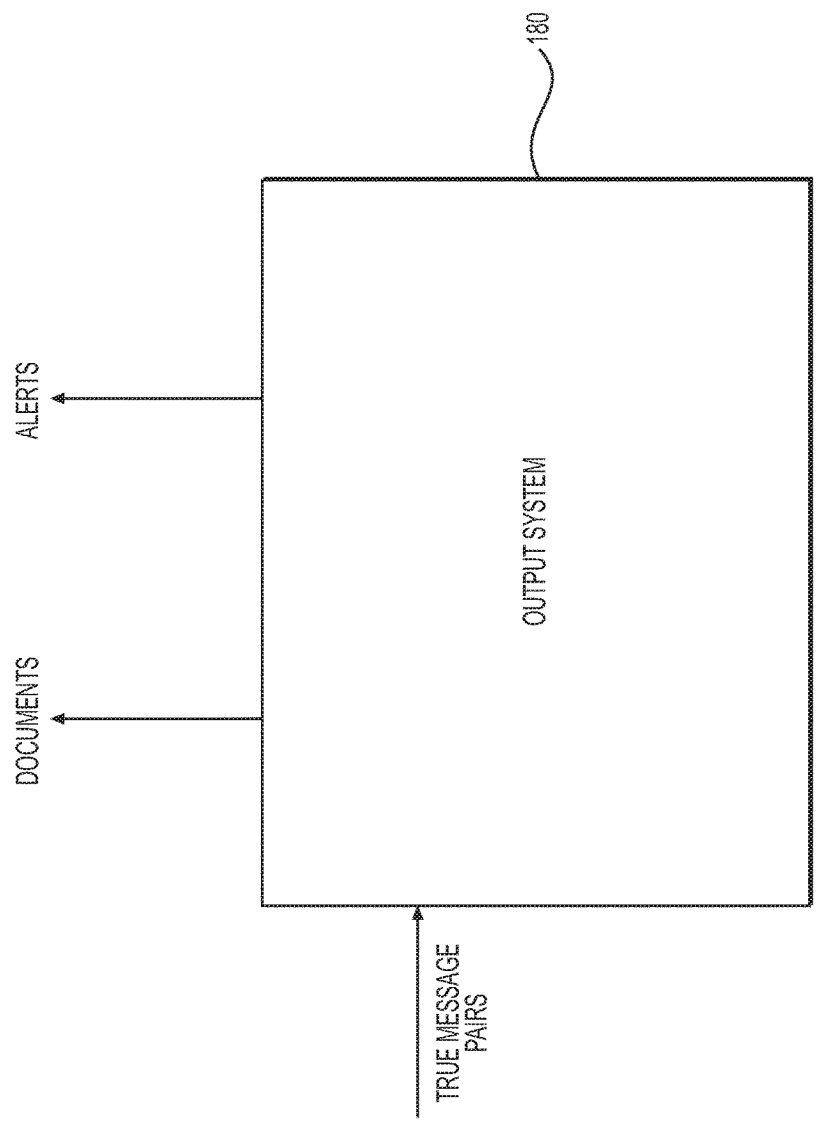

COMMUNITY-BASED REPORTING AND ANALYSIS SYSTEM AND METHOD

BACKGROUND

Government and non-government agencies and entities desire and may solicit participation of a target audience in an event reporting system, program, or campaign. The target audience may be the general public or a subset of the general public. The target audience may be nation-wide or local. The target audience may be defined by specific characteristics. An example system that facilitates and encourages event reporting is the 911 emergency call system. Another example is the U.S. Department of Homeland Security (DHS) "if you see something, say Something™" event reporting campaign, which has as one goal, to and its partners raise public awareness of the indicators of terrorism and terrorism-related crime using television and radio Public Service Announcements (PSAs), partner print materials, transit opportunities, billboards, and other media. Across the nation, we're all part of communities. Beyond DHS, local police forces and neighborhood watch groups push for reporting of suspicious activity by their target audiences. In all these "event reporting" campaigns, the degree to which the target audience participates is a factor in success or failure of the reporting event campaign. These and other event reporting systems rely on the active participation of the target audience, and are therefore successful to any extent by the degree of participation by the target audience as well as to the degree events are reported accurately.

SUMMARY

A community-based reporting and analysis system comprising a program of instructions stored on a non-transitory computer-readable storage medium, wherein when executed, the program of instructions cause a processor to receive one or more documents related to a domain of interest; identify and extract one or more data items from the one or more documents; determine if an identified and extracted data item comprises a true mention of a named entity; analyze a context of the true mention of the named entity in the document; and determine, based on the analyzed context, if the document is a true document.

A computer-implemented method for analyzing documents, comprising a processor receiving one or more documents, from a community-based document delivery system, related to a domain of interest; the processor identifying and extracting one or more data items from the one or more documents; determining if an identified and extracted data item comprises a true mention of a named entity; analyzing a context of the true mention of the named entity in the document; and determining, based on the analyzed context, if the document is a true document.

A system comprises a program of instructions stored on a non-transitory, computer-readable storage medium. Execution of the program of instructions cause a processor to acquire documents related to a specified domain of interest; process the acquired documents to identify one or more data items; analyze the one or more data items to determine that at least one of the data items comprises an identified named entity; verify the identified named entity corresponds to a listed named entity stored in a data structure accessible by the processor; determine the verified named entity corresponds to a true mention of the named entity by: analyzing a context of the document, and determining the context of the document matches a use of the true mention in the document; determining the document corresponds to a true document.

DESCRIPTION OF THE DRAWINGS

The detailed description refers to the following figures in which like numerals refer to like items, and in which:

FIG. 1A(1)-1A(4) illustrate documents that may be captured and used by the herein disclosed systems;

DETAILED DESCRIPTION

Figure 1B:
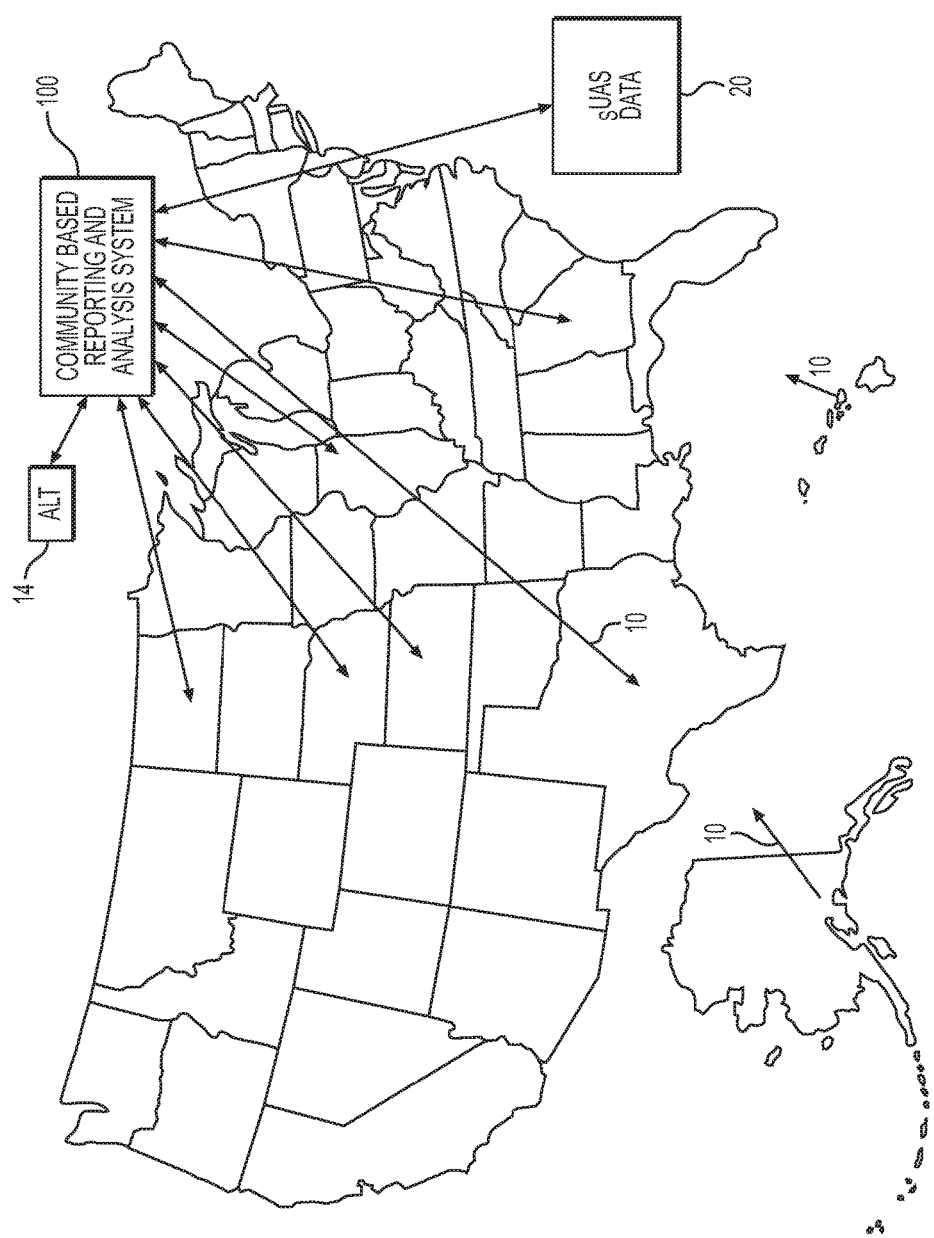
FIG. 1B illustrates an environment in which an example of a community-based reporting and analysis system is implemented.

Government and non-government agencies and entities desire and may solicit participation of a target audience in an event reporting system or program. The target audience may be the general public or a subset of the general public. The target audience may be nation-wide or local. The target audience may be defied by specific characteristics. Beyond DHS, local police forces and neighborhood watch groups push for reporting of suspicious activity by their target audiences. In all these "event reporting" programs and campaigns, the degree to which the target audience participates is a factor in success or failure of the reporting event campaign. These and other event reporting systems rely on the active participation of the target audience, and are therefore successful to any extent by the degree of participation by the target audience as well as to the degree events are reported accurately.

Voluntary reporting may result in events of interest going underreported or unreported. Thus, systems that rely on voluntary reporting may not adequately address safety and security issues.

Social media, and social network sites (SNS) are used by millions of people in the U.S. to record a wide range of interests and events. With wide-spread adoption and the ability to generate large volumes of timely data, these sites may provide valuable resources for data in certain situations. The herein disclosed systems and methods leverage information that may be publicly available from SNS and other "big data" sources to provide accurate and timely event reporting without a need for individual reporting of such events.

An example situation in which the herein disclosed systems and methods may be implemented to improve safety and security involves the seven million small Unmanned Autonomous Systems (sUAS) that are expected to be operating within the National Airspace (NAS) by the year 2020. The influx of sUAS into the NAS has tremendous potential social and economic benefit, but also represents a significant challenge for the Federal Aviation Administration (FAA), which is responsible for maintaining the safety of the NAS. The lack of widespread, low altitude radar coverage and transponders onboard sUAS means that when a sUAS is involved in an unsafe activity there may be insufficient data to analyze the incident or to even know the event occurred. This lack of data impedes the FAA's ability to ensure safe operations of manned and unmanned aircraft in the NAS.

In the absence of automated surveillance systems such as low altitude radar systems, the FAA relies on pilot, air traffic and citizen reports to monitor sUAS encounters. However, the current reporting system requires detailed explanation and can deter the normal observer from taking action. Pilots of manned aircraft are well-suited to provide detailed reporting when encountering a sUAS. However, these encounters often occur near airports during approach or take off, (see FAA Pilot UAS Reports https://www.faa.gov/news/updates/?newsId=83544) when the pilot's workload is highest and his ability to relay information about the encounter can be compromised. Airport surveillance systems are not designed to track low flying sUAS. While future regulations may require transponder devices on commercial UAS, there is currently no surveillance solution to universally monitor sUAS activity. Additional sources of data may supplement current reporting and surveillance.

The herein disclosed systems and accompanying methods provide mechanisms for mining big data sources such as SNS messages and to use the mined data in a reliable event-reporting scheme. In particular, the data mining techniques can be applied to air traffic safety analysis. If flight information can be derived from social media messages the number of reported sUAS observations can be expanded exponentially. This increased dataset can then drive safety decision making.

FIG. 1A(1) illustrates a document that may be used by the herein disclosed community-based reporting and analysis systems. In FIG. 1A(1) document $10_1$ is a SNS message posted on a social network site. However, the document $10_1$ may be an e-mail or a blog post on a Web site, and so on. The document $10_1$ may be posted after the loss of a sUAS. The document $10_1$ includes data fields 11 and data objects 12 (collectively, data items 13), although the naming conventions used in FIG. 1A(1) are arbitrary. In general, data fields 11 provide information such as date, time, and location. The data fields 11 may be header information. Similar information may be contained in hidden data fields such as in meta data fields. In the FIG. 1A(1), the data fields 11 include the date, September (Sep) 15 and time, 3:28 pm. The data fields 11 may also provide location information; in the example, namely Woodford, Va. Finally, the data fields 11 may provide image data, such as a photograph of an author of the document $10_1$. that might be posted after the loss of a sUAS. The document $10_1$ contains data objects 12 that can be used to infer that a sUAS incident may have occurred. "Phantom 4" is a type of sUAS. "Drone down" indicates a likely crash. Information extracted from documents like document $10_1$ may be useable in determining types of incidents, frequency of occurrence, and location. Correlation with other data sources, such as weather sources, may provide additional information for determining conditions and causes, which are the first steps in mitigating risks.

FIGS. 1A(2)-(4) illustrate, respectively, SNS messages $10_2$-$10_4$.

FIG. 1B illustrates an environment 1 in which an example of a community-based reporting and analysis system 100 is implemented. The system 100, as shown in 1B, receives messages $10_i$ from multiple SNS feeds using the fields' public Application Program Interface (API). The system 100 then applies a disambiguation system to extract and classify information that may be contained in the messages $10_i$. In an example embodiment, the disambiguation system includes an interpretive deep learning neural network, and the messages $10_i$ are processed using the neural network. The neural network examines each message $10_i$ to determine relevance and categorizes those messages $10_i$ pertaining to sUAS activity using learned criteria. SNS messages $10_i$ may be analyzed for possible geographic location information and other information. Potential incidents or hazards may generate alerts 14, which may be reviewed by subject matter experts and, if verified, classified according to an aviation safety taxonomy (such as used by the Aviation Safety Reporting System (ASRS)). A generated database of sUAS activity 20 is used by the air navigation service provider (ANSP) and other stakeholders to determine steps and operational changes needed to minimize safety risks. In an aspect, the system provides user-readable products indicating a predicted event related to the domain of interest. In an embodiment, the system provides alerts in the form of electronic and hard-copy documents stating an event occurred with a specific probability and a specific confidence level. The events relate to the domain of interest. In an embodiment, the events may be predefined, such as a sUAS crash, near miss, air space violation, or another event that may be potentially dangerous or otherwise untoward. In another embodiment, the system learns classifications for events and reports their occurrence. The system also may provide copies of true messages (defined below) that support the alerts.

Since human monitoring of enormous volumes of data generated by sources such as SNS is unfeasible, the system 100 may use a machine learning capability of a neural network to provide accurate filtering and processing of SNS messages $10_i$.

The neural network may interact with components of a natural language processor (NLP) to derive contextual information from the messages $10_i$.

In the context of a machine learning system that implements a neural network, the neural network's input layer may represent a base level of data points as categorized from the SNS message $10_i$; these then are relayed through a series of layers with each node holding a set of specific "weights" that analyze parsed sections of the message to determines validity of the "interpretation." By teaching the neural network the difference between correct and incorrect outputs through modification of the weights, the neural network refines its ability to discern between false and true mentions (or false or true messages). Semantics may be useful for interpreting these messages, and the system 100 may determine common phrases, abbreviations, and uses of language that may go unnoticed by a simple keyword search or analysis. Accurate reporting of data requires an iterative process to improve capabilities and keep up with syntax used by SNS posters.

The system 100 may include additional software components to read SNS messages 10i using a method of image recognition. The system 100 will be able to identify instances of true messages 10i by identifying pertinent information found within visual documents. By relating a particular pattern of pixels within the image to an object(s) or landmark the system 100 has stored within its memory it will be able to classify images as "true" or "false" in terms of identifying UAS activity (e.g. identify an object in an image as a quadcopter or use a landmark's frame of reference to identify an aerial shot in restricted airspace). Training data can be used to allow the system to recognize specific vehicles based on the direction they face and discernable traits such as number of propellers, sizing, and identifiable appendages. Categories can be narrowed to popular models in order to refine the search pattern of the system and reduce the number of possible false positive reports.

A natural language processing system may be or may include a machine learning system, or may be a component of the machine learning system. The natural language processing system may receive a document and may search the document to identify specific words, terms, or other data elements using, for example, named entity recognition. The natural language processing system then may predict the statement of the subject matter (i.e., the domain of interest) of the document or SNS message, or make other predictions related to the document or SNS message. For example, the system may predict, with some confidence level, that the SNS message $10_1$ of FIG. 1A(1) relates to a sUAS crash.

In some embodiments, the herein disclosed natural language processing system may be a targeted system in the sense that the system incorporates defined terms. Alternately or in addition, embodiments of the herein disclosed natural language processing system may be trained using training examples from well-behaved sources. For example, news reports that have been human-annotated with part-of-speech tagging may be used as training examples to train a natural language processing model. When the natural language processing system has been trained on training examples from a well-behaved source and then is given inputs such as SNS messages or Web documents such as blogs, for example, the results (i.e., accuracy in defining a SNS message as a true message or a false message) may be much worse than when the natural language processing system is given inputs similar to the training examples. That is, a trained natural language processing system may not perform as well in certain applications and scenarios as the system's training might suggest. One reason is that SNS messages and similar documents may be short, grammatically unsound, and lacking in context. The natural language processing system may have difficulty identifying the part-of-speech of words in such a document, including disambiguating syntactically confusable labels, determining the syntactic structure of the text, recognizing images, and converting audio data items to text. This confusion may reduce the usefulness of the natural language processing system in interpreting SNS messages and other documents.

To improve its performance in practice, the herein disclosed natural language processing system may be trained using a training data set including a training example set to which annotations may be added to obtain an annotated training data set. The natural language processing system then may be trained using the annotated training data set to obtain a trained natural language processing system.

The natural language processing system also may predict a data item, or mention, in a SNS message is a true mention (and correspondingly, that the SNS message is a true message), along with a confidence score for the prediction. A prediction with a confidence score below a threshold (e.g., 75%) may be filtered out.

The annotations incorporated by the natural language processing system may be used by the natural language processing system to evaluate the prediction of the natural language processing system. Part-of-speech tagging in the training data sets also may be used to evaluate the prediction of the natural language processing system.

To train a natural language processing system to make better predictions on documents input from poorly-behaved sources, such as, for example, SNS messages and other Web documents, embodiments of the herein disclosed disambiguation system 110 may include various mechanisms to implement the desired annotations. In an embodiment, an information retrieval system may be used to annotate data items. The information retrieval system annotations may relate various parts of the text to, for example, a knowledge graph, a concept graph model, and a named entity repository, and may identify data items (parts of the text) as multi-word expressions, phrases, and proper names. As described herein, these information retrieval system annotations may be used to assist in the training of a natural language processing system. For example, the natural language processing system may have difficulty disambiguating verbs and adjectives that are being used as proper nouns in the context of a SNS message. Annotations generated by an information retrieval system may help to train the natural language processing system to make better predictions regarding such ambiguous words and phrases. For example, the accuracy of the natural language processing system's part-of-speech predictions may be evaluated against both the part-of-speech tagging and information retrieval system annotations in the training examples during supervised training. The accuracy evaluation may be used to adjust the natural language processing system, resulting in an improved trained natural language processing system.

After training, the natural language processing system may be used to make predictions for new input documents such as new SNS messages and new blog posts. The trained natural language processing system may be given input text, such as a SNS message, that has been annotated by an information retrieval system. The trained natural language processing system may make predictions for the text of the SNS message. Specific examples of such predictions include named entity recognition predictions. More generally, such a prediction may identify any mention of a named entity or domain of interest, and such entities and/or concepts then may be classified into groups of similar meaning. Each prediction may be assigned a confidence score by the trained natural language processing system, and the confidence score for some predictions may be adjusted based on the information retrieval system annotations for the input text.

An aspect of the herein disclosed community-based reporting and analysis system 100 is a component or system that determines true mentions of named entities from a list of named entities within a collection of documents such as the document $10_1$ to $10_4$ of FIGS. 1A(1)-FIG. 1A(4), respectively, as well as not true (false) mentions of named entities from the list of named entities within the same collection of documents. The system 100 may receive many thousands of SNS messages in a given period, and though operation of system components, may predict, with some confidence level, that a mention of a named entity in a SNS message is a true mention or a false mention, and though a similar process of examining data items in the SNS message, may further predict the SNS message is a true message or a false message, again with some confidence level. For the specific message $10_1$ of FIG. 1A(1), the system 100 components may identify the data item "Phantom 4" as a named entity mention (a specific model of a sUAS) with a 95 percent confidence level given the presence of the (partial) data item "drone" in the same message. Considering other data items in the SNS message $10_1$ of FIG. 1A(1), the system 100 components may associate the data items "drone down," "bottom" and "Lake Caroline" as an indication of an event (a crash) associated with the Phantom 4 sUAS with a confidence level of 90 percent.

How the system 100 produces these and other predictions is disclosed herein using the following terms and their definitions:

Disambiguation. Disambiguation refers to methods and structures that make the content of a document unambiguous or at least less ambiguous by extracting or facilitating the extraction of data items, and their relationships to other data items, from the document and comparing the data items to known quantities, events, or processes. In the example of FIG. 1A(1), the document is the SNS message $10_1$, which includes data items 13, and the structures of the herein disclosed systems, and the corresponding methods, operate to make the content of the SNS message $10_1$ unambiguous by relating the data items 13 to specific named entities, as well as making other, higher order analyses concerning the data items 13. In an aspect, comparison of an extracted data item 13 to a list of named entities is a first order operation, and analyzing relationships between and among data items 13, for example, is a second order operation.

Named entity. Named entity refers to any subject matter that is a target of interest, and that may have a well-established and known name, including a person, a location, an organization, a product, or an event, for example. A named entity may be expressed as a proper noun, but named entities are not limited to proper nouns. In the example SNS message $10_1$ of FIG. 1A(1), named entities include at least "Phantom 4" and possibly "Lake Caroline."

Domain. Domain pertains to a field associated with a named entity, a document, or otherwise to a subject matter of interest. For example, one list of named entities may pertain to the field of unmanned aircraft (sUAS). Another list of named entities may pertain to airports. Yet another list of named entities may pertain to locations within a geographical region, and so on. A domain of interest may be the subject matter, sUAS crashes. A document reciting a sUAS crash may have as the document's domain, sUAS crashes. The domain need not conform to an accepted classification in any classification scheme.

Document. Document refers to any text, image, or audio information that conveys any meaning in any environment. In some environments, document may refer to a text document containing one or more pages, although the document also may contain other types of media content, such as images, and audio. Alternatively, or in addition, document may refer to a Web page or a Web site. Alternatively, or in addition, document may pertain to a message of any type, such as an instant messenger (IM) message, a social network (SNS) message, a Twitter message, and a short message service (SMS) message, for example. Document also may refer to a record in a database.

Mention. Mention refers to the occurrence of a data item in a document. The data item may be a string or a named entity. For example, a mention of the UAS manufacturer "DJI" may correspond to the string "DJI Phantom 4" within a document. A mention may be formally identified by a pair comprising a named entity $E_i$, and a document $D_j$ that contains the string associated with the named entity. The pair may be denoted as $(E_i, D_j)$. A mention by itself is neither a true mention nor a false mention (see definitions below) and its status as true or false is either resolved by the herein disclosed system, or the mention is discarded. Thus, a mention (of a named entity) may be considered simply as the presence of a named entity $E_i$ in the document $D_j$ (that is, without making explicit reference to a string or other data items associated with $E_i$).

Data item. Data item is a word or words, including acronyms or proper names (e.g., DGI), number or numbers (e.g., 1776) (i.e., text) that has a defined, known or knowable meaning in relationship to the domain of a document. A data item also may be an icon, a still image or a video, or an audio snippet. For example, a still photograph or a drawing of a quadcopter may be a data item. A named entity is a data item.

String. String (Si) refers to a series of data items, partial data items, and characters associated with a named entity. The string also may refer to one or more other concepts besides named entity. A string may include one or more words, numbers, icons images or audio snippets. An example string is "Phantom 4 quadcopter."

True mention. True mention corresponds to a mention that is a valid occurrence of a named entity in a document considering the domain of interest. For example, a document that uses the data item (words and numbers) "Phantom 4" when discussing products of the company DJI, may correspond to a true mention of the Phantom 4 quadcopter manufactured by DJI even if the data items "DJI" and "quadcopter" do not appear in the document. In this example, the document's domain may be sUAS crashes.

False mention. False mention corresponds to a mention that is not a valid occurrence of a named entity in a document. For example, a document that uses the word "Phantom" in a SNS message discussing Broadway plays may be a false mention of the named entities "DJI," "Phantom," "DJI Phantom," or "Phantom 4 Quadcopter." The data item "DJI" appearing in a document related to imports from China may not be a true mention (in which case, the mention would be a false mention) when the domain of interest is sUAS crashes.

Occurrence. Occurrence refers to at least a single mention of a named entity (or certain data items) in a document. A document may contain zero or one or more occurrences of any named entity or any of a plurality of different named entities. A mention $(E_i, D_j)$ means that the document $D_j$ contains at least one occurrence of $E_i$, although the $D_j$ document may include multiple occurrences of $E_i$.

Tweak. Tweak refers to an operation in which an extracted data item may be modified for comparison to known named entities (or other catalogued data items), yet retained (saved in a database) in its original form, possibly with links or reference to the "correct" known named entities. For example, a string in a document may be "DGI Phantom drone." The data item may be tweaked to read "DJI Phantom drone," and "DJI Phantom quadcopter," where "DJI" and "Phantom" are named entities. The two tweaked data items ("DJI Phantom drone" and "DJI Phantom quadcopter,") then are compared to lists of known named entities to determine if the original (untweaked) data item qualifies as true or false mentions. The original data item may be saved in a named entity list with a link to or reference to correctly spelled named entities that contain "DJI" (e.g., "DJI," "DJI Phantom," DJI Phantom 4," and so on). Tweaking also may be applied to a list of named entities to expand the list, for example.

Context. Context refers to the circumstances in which a mention appears in a document. In an aspect, context may correspond to other data items in the document, such as, for example, the words preceding or following the mention, images corresponding to the mention (a video of a Phantom 4 quadcopter flying over Lake Caroline—although the video also may be a mention), and audio snippets.

True Message/False Message. True message (or document) refers to a message that includes at least one true mention. False message (or document) refers to a message that contains no true mentions.

Given the above definitions, objectives for design of the community-based reporting and analysis systems disclosed herein include to correctly classify true messages as true messages and not classify false messages as true messages, and to provide an acceptable confidence level for such classifications. Moreover, the systems function to find true messages that report or relate to a specific event that constitutes a domain of interest.

FIG. 2A(1) illustrates an example community-based reporting and analysis system 100 implemented on one or more physical or virtual computer platforms 99. The system 100 may include machine instructions (not shown) stored on non-transitory computer-readable storage medium 101. Processor 104 may access the machine instructions, load the machine instructions into memory 102 over bus 106, and execute the machine instructions. The computer platform 99 may include a monitor and keyboard 108, and other information and command input and output devices. The arrangement of components in FIG. 2A(1) is for ease of description and other arrangements are possible. For example, multiple platforms 99 and multiple systems 100 may be used. In addition, multiple processors 104 may be included. The multiple platforms 99, systems 100, and processors 104 may be dispersed (for example, in different States or Regions of the U.S.) or may be co-located. Additionally, some components may be "in the cloud."

FIG. 2A(2) shows the community-based reporting and analysis system 100 in more detail. In FIG. 2A(2), system 100 includes input system 105, disambiguation system 110, data store 150, information retrieval system 160, analysis system 170, and output system 180. The arrangement of the systems of FIG. 2A(2) is for ease of description, and the various systems may be combined or decomposed without affecting the functions of the system 100. For example, the input system 105 and the output system 180 may be combined. The input system 105 receives messages, documents, feeds, and data. For example, the input system 105 may include, or may be coupled to a Web crawler that accesses and searches a plurality of data sources including structured, semi-structured, and unstructured data sources, including big data sources, to identify and retrieve information, data, and documents relevant to the domain of interest of the system 100 (e.g., sUAS, and more specifically, crashes, near misses, aircraft interference, air space intrusions, or similar incidents involving sUAS). The input system 105 also may receive, in real time, streaming data, including publicly-available data from services such as instant messenger (IM) services, social networks (SNS), short message services (SMS), for example. Further, the input system 105 may receive information that may processed to construct named entity lists and other data structures used by systems and components of the system 100.

The disambiguation system 110 operates to identify, extract, and analyze data items found in certain documents (e.g., SNS messages) retrieved by the input system 105. FIG. 2A(3) shows components of the disambiguation system 110. The system 110 includes natural language processing system 120, machine learning system 130, information retrieval system 160, and analysis system 170. Components of the disambiguation system 110 (i.e., the natural language processing system 120, machine learning system 130, information retrieval system 160, and analysis system 170) may be stored as machine instructions in non-transitory, computer-readable storage medium 101 and executed by the processor 104 (see FIG. 2A(1)).

In some embodiments, the structures and functions of the disambiguation system 110 may be combined into fewer components or may be decomposed into more components. Thus, the illustrated arrangement of components is for ease of description, and other arrangement besides those illustrated are possible. Embodiments of the data store 150 are disclosed with respect to FIGS. 2B(1) and 2B(2). Embodiments of the natural language processing system 120 are disclosed with reference to FIG. 2C. Embodiments of the machine learning system 130 are disclosed with reference to FIGS. 2D(1)-(2). Embodiments of the information retrieval system 160 are disclosed with reference to FIG. 2E. Embodiments of the analysis system 170 are disclosed with reference to FIG. 2F).

FIG. 2B(1) shows an example of the data store 150. The data store 150 may store a training data set 152, an annotated training data set 154 and a test set 156. In addition, the data store 150 may include a document store 158. The training data set 152 may be a collection of training examples used for training natural language processing systems. The training examples may be documents that include text and annotations indicating the part-of-speech of the words in the text. This part-of-speech tagging may be added to the training examples by a human. For example, the training examples may be human-annotated news documents or search queries. The annotated training data set 154 may be a collection of training examples that have been annotated by, for example, the information retrieval system 160. The information retrieval system 160 may be able to obtain data from the data store 150. For example, the information retrieval system 160 may obtain the training data set 152 from the data store 150, annotate the training examples in the training data set 152 with information retrieval system annotations, and store the annotated training examples as the annotated training data set 154 in the data store 150.

FIG. 2B(2) provides a simplified example of certain operations of the system 100. In one aspect of its operation, the system 100 receives the documents $10_1$-$10_4$ (i.e., a group of documents $10_i$) shown in FIGS. 1A(1)-1A(4) and processes the information contained therein. The system 100 also, in an aspect, may receive a lists $151_i$ of named entities pertaining to the domain of small unmanned aerial systems (sUAS). For example, the list $151_1$ may include names of sUAS manufacturers (e.g., DJI) and their specific products (e.g., DGI's Phantom 4 Quadcopter). The data in lists $151_i$ may be stored in the document store 158 (see FIG. 2B(1)) and thus may constitute a documents database 151. The system 100 may operate to extract named entity data from the lists $151_i$ and format the extracted data into data structures that are stored in the document store 158 as data tables $158_i$ in database $150_i$. In the example of FIG. 2B(2) the first named entity $E_1$ of data table $158_1$ is DGI, a real UAS manufacturer and the next two named entities $E_2$, $E_3$ are fictional UAS manufacturers mega and Agile. In data table $158_2$, the first named entity $E_4$ is Phantom 4, a quadcopter manufactured by DGI, and the second named entity $E_5$ is a fictional product named MegaCopter (and manufactured by fictional UAS manufacturer Mega). In an aspect, one function of the system 100 is to identify named entities in a group of documents $10_n$; that is, to find true mentions of the named entities in the documents $10_n$. FIG. 2B(2) shows the four documents (SNS messages) $10_1$-$10_4$ from FIGS. 1A(1)-1A(4). A simple comparison suggests that documents $10_1$ and $10_3$ should be classified as true mentions since each message contains at least one named entity $E_i$, and documents $10_2$ and $10_4$ as false mentions since neither message contains at least one named entity $E_i$. In an embodiment, the system 100 automatically generates the above result by leveraging the homogeneity of the lists of named entities in data tables $158_1$ and $158_2$—namely, the fact that in the examples of FIGS. 1A(1) to FIG. 2B(2), all of the named entities $E_i$ belong to the same domain of interest—sUAS. In this aspect, the system 100 provides for first order, targeted disambiguation of captured SNS message content based on the domain lists extracted by the system 100.

Figure 2C:
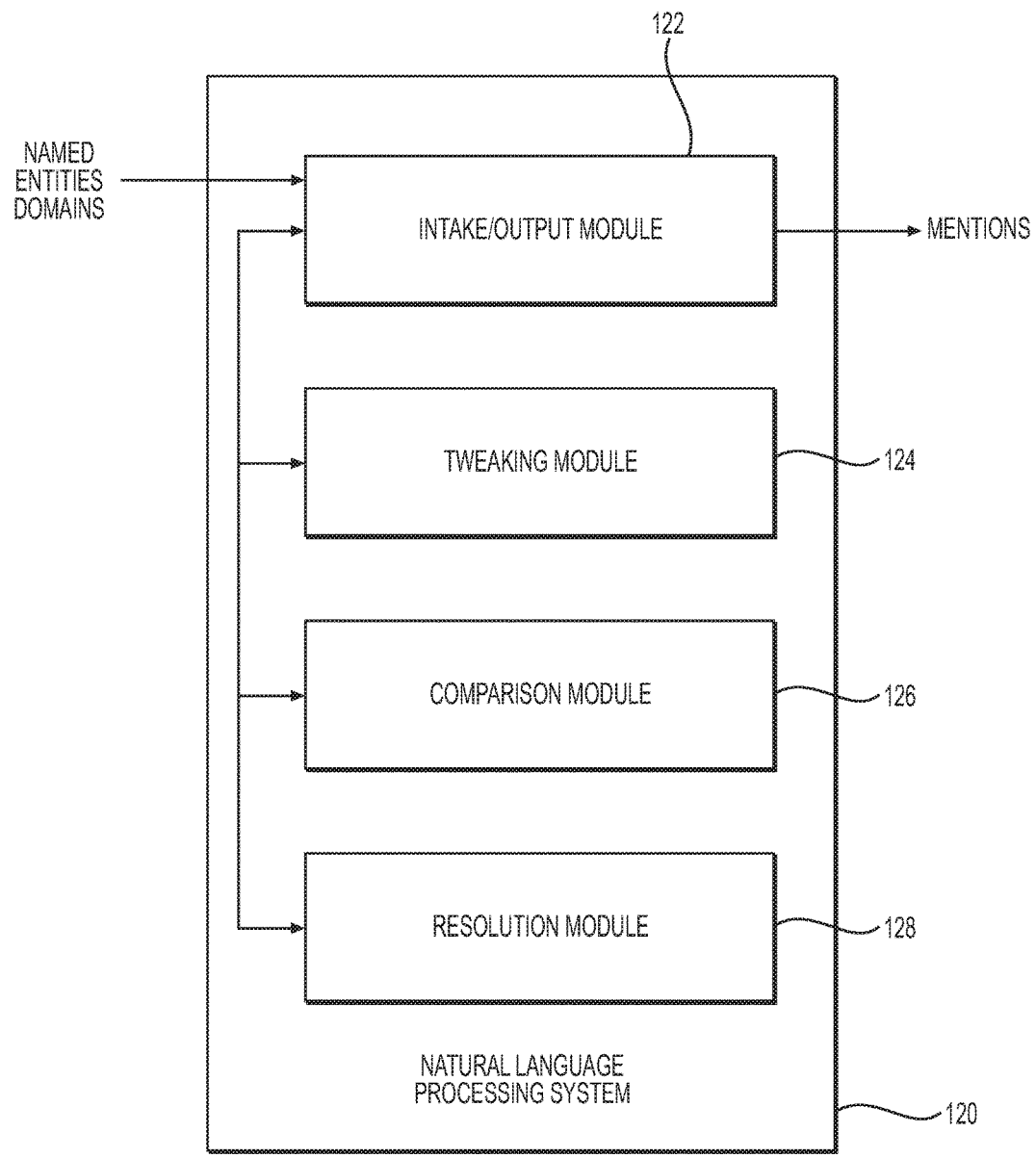
FIGS. 2A(1)-2A(3) illustrate example community-based reporting and analysis systems.
FIGS. 2B(1)-2G illustrate components of the example community-based reporting and analysis systems of FIG. 2A(1)-2A(3)

FIG. 2C illustrates an embodiment of the natural language processing system 120. In FIG. 2C, system 120 includes intake/output module 122, tweaking module 124, comparison module 128, and resolution module 128. The intake/output module 122 receives, for example, a domain of interest (e.g., sUAS unauthorized operations). In an embodiment, the module 122 also may receive a writing that lists named entities. An example of such a writing would be a list of sUAS manufacturers. Alternately, or in addition, the module 122 may receive the same or similar information in the form of an extracted list of such manufacturers. Further, the module 122 may receive other information, including information related to a stated domain of interest.

The tweaking module 124 may make adjustments to the received or extracted list of named entities to expand or otherwise adjust or add to the list to make the list more broadly applicable to the domain of interest. In making the tweaks, the module 124 may consult standard resources, including other writings, papers, electronic media, databases, dictionaries or thesaurus, for example. The tweaking module 124 also may make similar tweaks to data items 13 extracted from a document $10_i$.

The comparison module 126 compares the list of named entities, including a tweaked list, to data items 13, which themselves may be tweaked or adjusted, to determine if any data items, including possible entity names match the list of named entities. The resolution module 128 resolves each such match to determine if the data item constitutes a mention. Any data item 13 that constitutes a (named entity) mention is assigned a designation $E_i$ and may be paired with a corresponding document identification $D_j$. The output portion of module 122 then stores the pair $(E_i, D_j)$ in the data store 150.

The various modules of the system 120 also may be used to analyze data items 13 to determine part-of-speech information, proper names, and strings, to determine the relevance, meaning, and use of such data items 13.

The system 100, in an embodiment, may use second order, relational disambiguation of captured SNS message content. In an aspect of this second order, the disambiguation system 110 may proceed with a process of relational disambiguation that may relate the occurrence of true and false mentions in a single message or in two or more messages. For example, SNS message $10_1$ includes the named entity "Phantom 4" but no other named entity that relates to DJI or any other DJI products, or relates to any other drone manufacturer or drone manufacturer products. SNS message $10_3$ includes named entity "MegaCopter" and a video of the drone. The named entity "MegaCopter" and its video may constitute two true mentions in one SNS message, thereby increasing the probability that SNS message $10_3$ is a true message (given the domain of interest is sUAS). In addition, two SNS messages (messages $10_1$ and $10_3$), each contain at least one true mention of a named entity related to the domain of interest. This fact may be used to increase the confidence level that SNS messages $10_1$ and $10_3$ are true messages. In another example, SNS message 102 can be seen to be a reply to SNS message $10_1$. SNS message $10_2$ includes data elements ("fly," "water") that, when considered in the context of message $10_1$, suggest that SNS message $10_1$ is a true message (whether the domain of interest is "sUAS" or "sUAS crashes"). These and other rules may be used to increase the probability that a SNS message is a true message and to increase the confidence level that accompanies that determination. Furthermore, the above-described rules, as well as other rules, may be learned by the disambiguation system 110 using components of the machine learning system 130. As the rules are learned and refined, the disambiguation system 110 may store the rules in the document store 158, for example.

FIGS. 2D(1) and 2D(2) shows an embodiment of aspects and operation of the machine learning system 130. FIG. 2D(1) is a simplified flowchart showing an algorithm 131 executed through a component 132 (as illustrated in FIG. 2D(2), an artificial neural network) of the machine learning system 130 and processor 104 of FIG. 2B(1). In FIG. 2D(1), algorithm 131 is initiated at 131A, which begins a process of calculating an output 131B of the neural network 132 based on input values processed through a multitude of hidden layers to determine 133C if a document or SNS message $10i$ is a true message (that is, a successful identification of a domain of interest document), or, alternatively that the SNS message classification matches that of, for example, a training sample. If the message $10_i$ is a true message, the process proceeds to step 131E and stops. If the message $10i$ cannot be resolved as either a true message or a false message, the process moves to step 133D and weights of the layers are adjusted. The process then returns to step 131B.

The example neural network 132 is shown FIG. 2D(2) and includes input nodes, output nodes, and one or more hidden layers.

The artificial neural network 132, when trained, may be used to compute the probability (with some confidence level) that a message is a true message given that the message contains at least one qualifying data item or one true mention, or that a given message is a true message or is not a true message. Thus, a true message includes at least one qualifying data item such as at least one true mention of a named entity. Of course, a message could be classified as a false message given the message contains at least one qualifying data item or could be classified as a true message given the message does not contain a qualifying data item.

In environment 1 of FIG. 1B, many variables may be random and unknown (e.g., expressions of named entities, syntax, spelling, relationships between data items, etc.). To account for these factors, the network 132 may include mechanisms that compute the probability that a message is classified as a true message by representing conditional dependency among the random and uncertain variables. The mechanisms may use as a data input data sampled or acquired in the environment 1. Moreover, the mechanisms handle many kinds of variables present in the environment 1. The neural network 132 provides a general framework for representing and learning non-linear conditional probabilities mixed with continuous, discrete, multi-valued, and multi-dimensional variables. For a simple Bayesian network X→Y, the conditional probability P(Y|X) can be computed when information about X is available. Thus, the posterior probability distribution of Y given P(X) is computed by operation over the sample space $\omega_x$ of X by:

$$P(Y=y)=c\int_{x\in\Omega_x}P(y|x)dP(x), \qquad \text{EQN 1}$$

where c is a constant.

In the environment 1 of FIG. 1B, a simple Bayesian network X→Y may not be sufficient to predict the probability correctly classifying a message as a true message or a false message because many different (and random) variables may affect probability, and the effects may be unknown. A neural network can handle both discrete variables and continuous variables in the same manner. When Y is a discrete random variable, Y=(y₁; y₂; . . . ; y_k), k neurons can represent the probability vector of Y, P(y₁); P(y₂); . . . ; P(k) with normalization to make the sum equal to 1. In a typical feed forward neural network, input neurons represent X, output neurons represent Y, and hidden neurons connect the input and output neurons. Then, conditional probability P(Y|X=x) may be represented as $$f_k(x) = g\left(\sum_j v_{jk} g\left(\sum_i w_{ij} x_i + b_j\right) + b_k\right) \quad \text{EQNS 2}$$

$$g(x) = \frac{1}{1 + \exp(-x)}$$

$$P(y_k \mid x) = f_k(x) / \sum_k f_k(x)$$

By using a neural network to represent the conditional probability of node Y, the Bayesian neural network may be constructed. In an embodiment, the Bayesian neural network represents a solution to the following:

$$P(A \mid B) = \frac{P(B \mid A) * P(A)}{P(B \mid A) * P(A) + P(B \mid D) * P(D)}, \quad \text{EQNS 3}$$

where
P(A|B) is the probability that a message will be classified as a true message given the message contains at least one qualifying data item (e.g., at least one true mention of a named entity, a qualifying string, and so on);
P(A) is the probability that a message is a true message;
P(B) is the probability that a message contains at least one qualifying data item;
P(B|A) is the probability that a message classified as a true message contains at least one qualifying data item;
P(D) is the probability that a message is not a true message [P(D)=1−P(A)]; and
P(B|D) is the probability that a message contains at least one qualifying data item given the message is not a true message.

The neural network 132, when trained, provides a prediction as to whether a document 10_i is a true document (SNS message) of in not a true document (SNS message). The neural network 132 may execute as part of the natural language processing system 120, or as an input to the system 120.

Figure 2E:
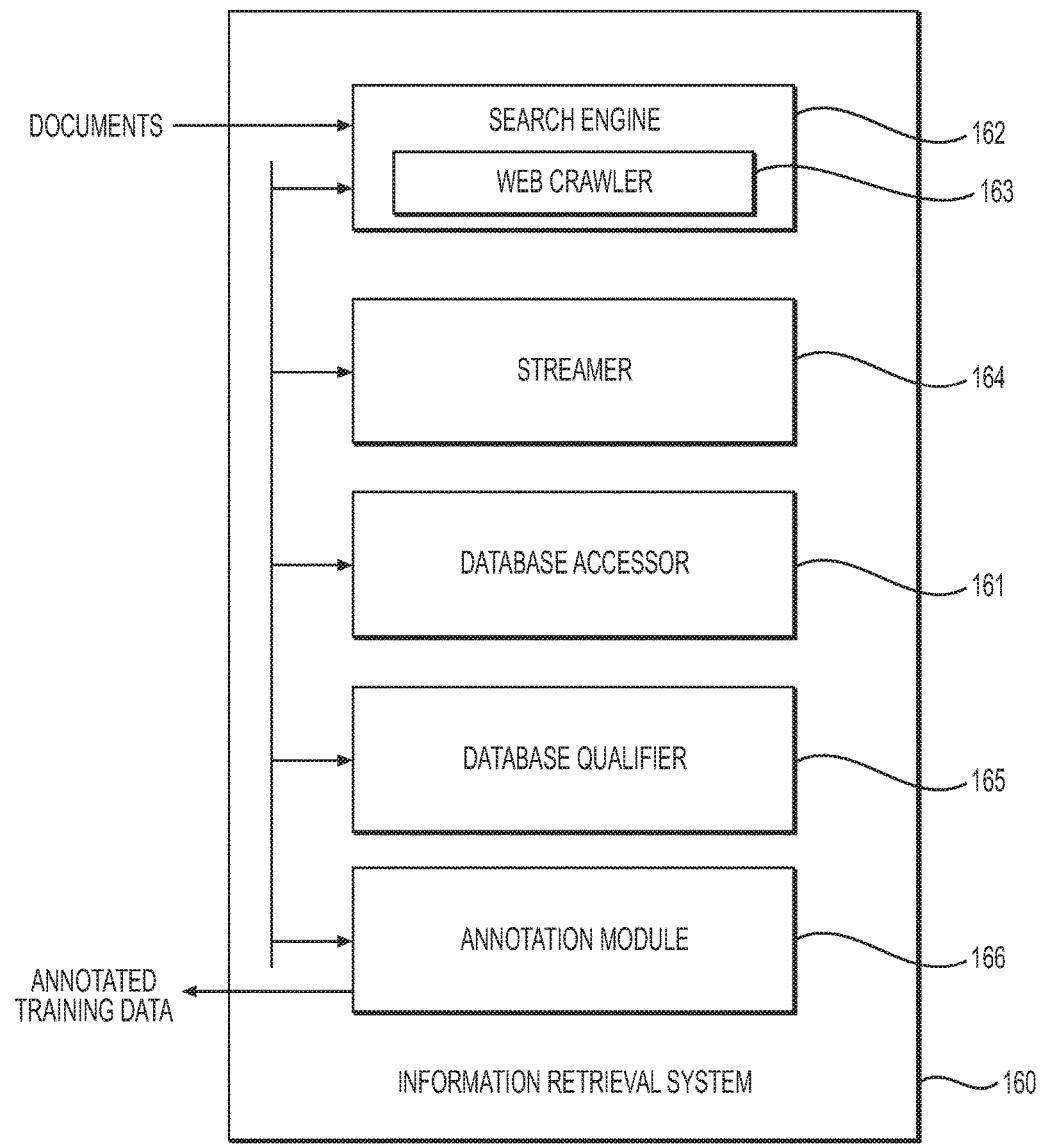

The information retrieval system 160 is shown in more detail in FIG. 2E. The information retrieval system 160 may be any suitable system that retrieves information. The information may be in the form of Web documents, for example. The information retrieval system 160 may be implemented in any suitable manner, such as, for example, with statistical or machine learning systems.

The information retrieval system 160 may include a search engine 162 that includes associated Web crawler 163. The Web crawler 163 may be configured to search selected online content that is publicly available. The Web crawler 163 may index certain Web sites that provide streaming data sources. The system 160 may include streamer 164 that consumes and processes streaming data such as streaming data (e.g., messages 10_i) from SNS sites. The search engine 162 may include, or may cooperate with, a database accessor 161 that performs an initial database access operation and a database qualifier 165 that determines the schema for a searched or accessed database in order to efficiently and accurately access data in the database. One system and method for determining a database schema is disclosed in U.S. Pat. No. 5,522,066, "Interface for Accessing Multiple Records Stored in Different File System Formats," the contents of which are hereby incorporated by reference. Thus, the system 100 may access and process "big data." Social big data, including text information and images (static and moving (video)); social big data in any format, such as short sentences (tweets) or news, or a keyword or hashtag may be collected and stored using Web crawler 163.

In an embodiment of the system 160, information retrieval system annotations may be added to the training data set. For example, the information retrieval system 160 may add information retrieval system annotations to the training examples in the training data set 152 to produce annotated training examples for the annotated training data set 154 (see FIG. 2B(2)). The annotated training data set 154 may be stored in the data store 150. The information retrieval system annotations may include, for example, annotations linking text to a knowledge graph, a concept graph system, and an entity repository such as an online database or encyclopedia, and annotations identifying parts of the text as multi-word expressions or n-gram concepts, phrases, and proper names. In an aspect, the information retrieval system 160 also may use components of a natural language processing system, including, for example, part-of-speech, tagging, syntactic parsing, mention chunking, and named entity recognition, in annotating the training examples. More generally, any technique for identifying mentions of entities and/or concepts may be used, and such mentions classified into groups of similar meaning. These components may be used separately, such as in part of a query processor in an information retrieval system that identifies parts of speech of a query. Alternatively, or in addition, these components may be obtained from the natural language processing system 120 (see FIG. 2C(1) operating in conjunction with the information retrieval system 160. In general, the information retrieval system 160 may use annotations as described to perform document retrieval and/or ranking in response to a query. The training examples in the annotated training data set 154 may include the original text of the training examples with part-of-speech tagging along with predictions as to where the different types of information retrieval system annotations may occur. Each prediction also may be associated with a confidence score indicating a level of confidence in the correctness of a prediction. For example, a phrase in the text of a training example may be annotated as a concept with a 55% confidence score, another phrase in the text may be annotated as being a knowledge graph entity with an 87% confidence score, and a word or phrase may be annotated as a proper name with a 73% confidence score. Parts of the text, such as a word or phrase, may have more than one information retrieval system annotation. Text for a two-word long proper name of a place in an annotated training example may, for example, be identified by part-of-speech tags as a noun. The first word of the proper name may be identified by an information retrieval system annotation as a beginning. The natural language processing system 120 may be trained with the annotated training data set. For example, the annotated training data set 154 may be used to train the natural language processing system 120. The annotated training examples from the annotated training data set 154 may be input into the natural language processing system 120 without the part-of-speech tagging. The natural language processing system 120 may make predictions about the text, incorporating the information retrieval system annotations. The predictions may be, for example, part-of-speech predictions, parse-tree predictions, mention chunking predictions, beginning, inside, and end label predictions, and named entity recognition predictions as disclosed elsewhere herein. Each prediction made by the natural language processing system 120 may have a confidence score. The predictions made by the natural language processing system 120 about the text of an annotated training example may be compared with the part-of-speech-tagging and information retrieval system annotations in the annotated training example. The accuracy of the predictions of the natural language processing system 120 may be determined, and adjustments may be made to the natural language processing system 120 in the appropriate manner for the type of supervised or semi-supervised machine learning used by the natural language processing system 120. For example, the predictions made by the natural language processing system 120 for text in a training example may be evaluated against the part-of-speech tagging and the information retrieval system annotations in the training example. Predictions with confidence scores that fall below a threshold may be filtered out and not used to determine the accuracy of the natural language processing system 120 during training. The natural language processing system 120 may be trained with any number of the annotated training examples from the annotated training data set 154, in any order, and may be trained with the same annotated training example multiple times. The result of training the natural language processing system 120 may be a trained natural language processing system.

Figure 2F:
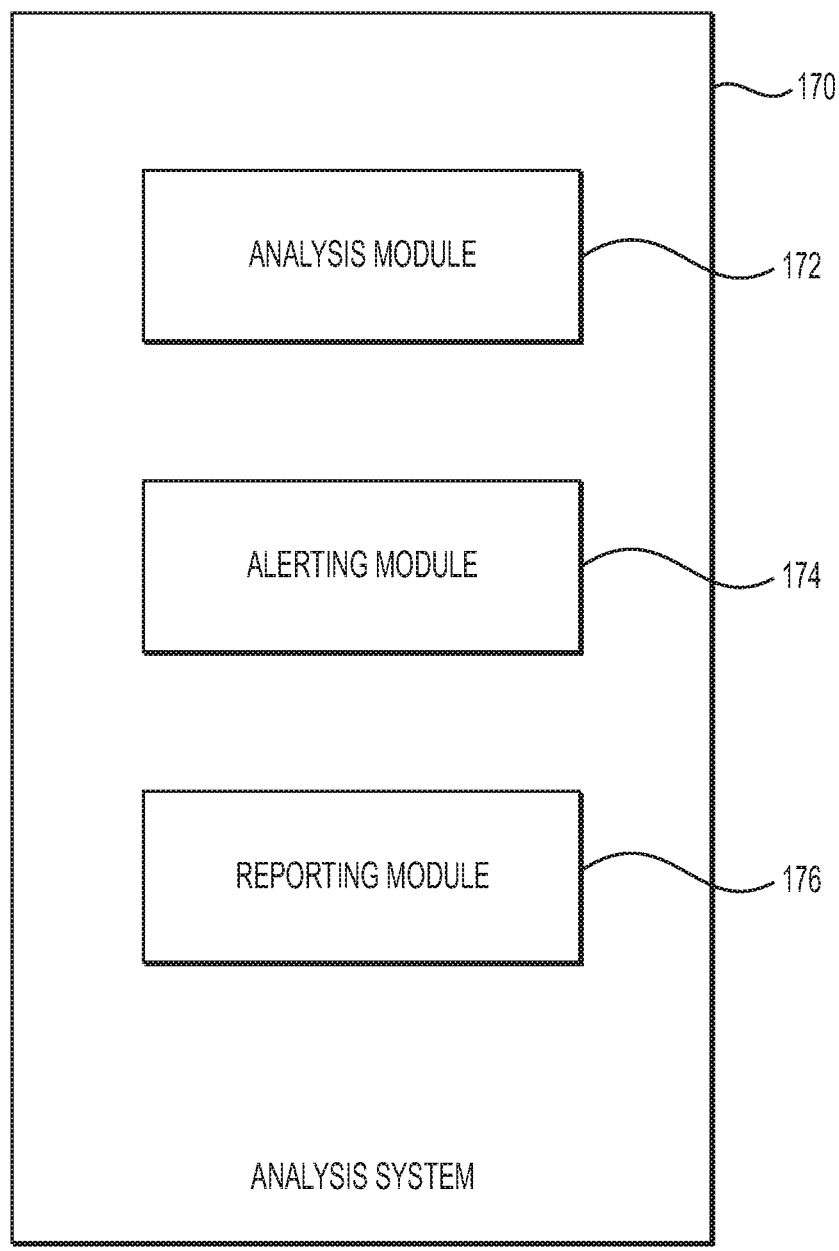

The analysis system 170 is shown in FIG. 2F and includes analysis module 172, alerting module 174, and reporting module 176. The analysis module 172 examines true documents in real time, or after a delay, as appropriate, although the system 100 normally performs all operations in real time. The analysis module 172 determines, based on data extracted from the document, such as date, time, and geo-location information in a document header or as document meta data, if activity or operations referred to in the document are ongoing or recent, in which case the analysis module 172 passes appropriate information to the alerting module 174, which formats and sends out an alert 14 indicating the activity is on-going or recently ended. The alert 14 may be electronic or hard copy or both. The alert 14 may be sent to specific personnel, to specific connected computers, or may be broadcast by, for example, posting on a Web site or using another alerting system. If the activity referred to in the true message is not recent, the information may be passed to the alerting module 174, which then formats an alert 14 notifying appropriate personnel and connected computers of the event. In either situation, the alert 14 may warn of dangerous or unauthorized operation of a sUAS. Information related to the alerts is passed to the reporting module 176, which may compare the activity noted in the document with reported events to determine if the true message correlates to any reported events. The system 170 may store any alerts 14 that issue and any correlations, in the data store 150.

The output system 180, shown in FIG. 2G, provides user-readable products indicating a predicted event related to the domain of interest. In an embodiment, the system 180 provides alerts 14 in the form of electronic and hard-copy documents stating an event occurred with a specific probability and a specific confidence level. The events relate to the domain of interest. In an embodiment, the events may be predefined, such as a sUAS crash, a near miss, an air space violation, or another event that may be potentially dangerous or otherwise untoward. In another embodiment, the system 100 learns classifications for events and reports their occurrence. The output system 180 also may provide copies of true messages that support the alerts 14. As noted above, the alerts 14 may be "live" alerts or may relate to events that have concluded. For example, during the pendency of a temporary flight restriction (TFR), the output system 180 may provide live alerts 14 relating to sUAS operations that violate the TFR.

Figure 3:
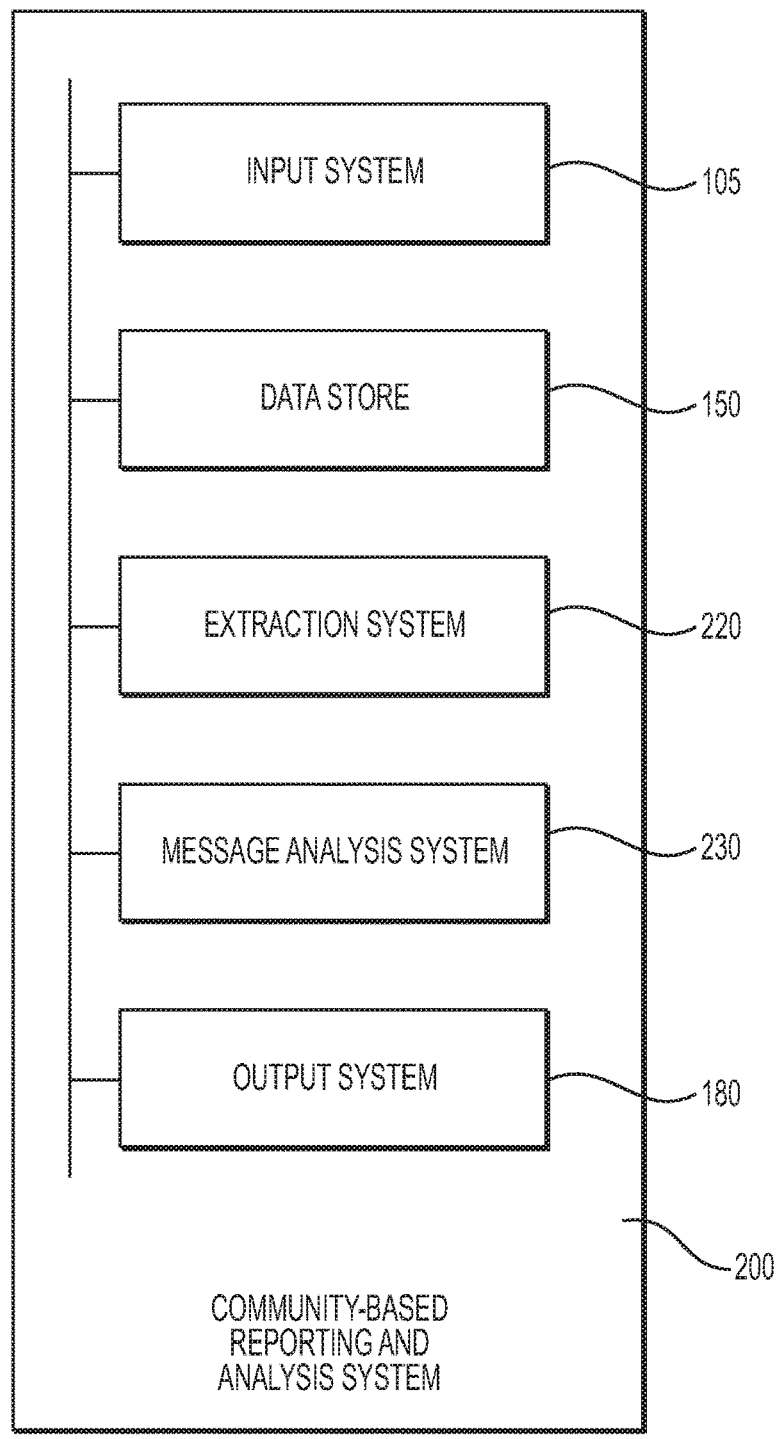
FIG. 3 illustrates an alternative community-based reporting and analysis system.

FIG. 3 illustrates an alternative community-based reporting and analysis system that may find and report events concerning a specific context through review of publicly-available documents such as SNS messages, Web documents, Web sites, and databases. In FIG. 3, system 200 includes input system 105 and output system 180, which has the same structure and function as the corresponding systems of FIG. 2A(2). The system 200 further includes data store 150, data item extraction system 220, and message analysis system 230. The data store 150 includes certain of the data structures shown in FIG. 2B(2), namely data tables $158_1$ and $158_2$ and the documents $151_i$ in data store 151. The data tables $158_1$ and $158_2$ provide lists of named entities, which may be developed from the documents $151_i$. With the use of the listed named entities in the data tables $158_1$ and $158_2$, the system 200 essentially is a targeted disambiguation system in the sense that the system 200 operates to find true mentions of named entities based on the established and stored lists of named entities.

Note that the data tables $158_1$ and $158_2$ provide only limited scope for named entities—sUAS manufacturers in data table $158_1$ and their products in $158_2$. Moving beyond data structures with sUAS manufacturers and their products, the system 200 may incorporate additional data structures with named entities for many other contexts such as geographical features, specific named geographic features, physical structures, including, for example, airports, and other contexts that may lend themselves to designation by lists. Thus, the system 200 may incorporate any number of data tables $158_i$ that relate in some manner to the domain of interest, namely sUAS, sUAS operations, and sUAS accidents.

The input system 105 receives a list of named entities from any source, pertaining to any domain of interest, such as sUAS crashes or unexpected events. For example, the input system 105 receives a list of named entities that are manually input by a human user. Alternatively, or in addition, the input system 105 extracts the list of named entities from a pre-existing table, database, and/or some other source (or sources). The input system 105 then stores the list of named entities in a data store 150. Data item extraction system 220 identifies occurrences of data items, including named entity data items, strings associated with the named entities, and other data items including images and audio data items within a collection of documents such as SNS messages. The occurrences correspond to mentions until the system 200 determines if the mentions are true mention or are not true mentions. The data item extraction system 220 may optionally tweak or expand each named entity (or other data items designated as a mention) in the list to a group of equivalent terms associated with the named entity or data item (such as synonyms). The system 220 may perform this tweak operation using resources such as a thesaurus, an acronym list, and a stemming analysis module, for example. This tweak operation may yield an expanded list of named entities or other data items. The extraction system 220 then may identify mentions for each named entity or other data items considering the tweaked (expanded) list of data items. The documents identified as having mentions, along with the mentions, may be stored in the data store 150 for further processing by the system 200. In an embodiment, the data store 150 may be implemented as accessible through a wide area network, such as the Internet. The analysis system 230 operates on the mentions and the documents containing those mentions to identify true mentions. The system 230 may determine a mention is a true mention by finding an exact comparison with an entry in one of the lists $158_i$. The system 230 may determine a mention is a true mention by assessing the similarity of a data item to entries in one of the lists $158_i$. The system 230 may determine a mention is a true mention by matching the mention to a true mention in the same document or in another document in the domain of interest. The system 230 may identify a mention as a true mention by finding a co-occurrence of the mention in the same document or in another document in the domain of interest. Finally, the system 230 may identify a mention as a true mention by consideration of the content in which the mention appears—for example, considering words or data items preceding or following the mention.

The systems and components disclosed above include programs of instructions and algorithms that may be stored on non-tangible computer-readable storage mediums such as the medium 101 and executed by a processor such as the processor 104, both of FIG. 2A(1). When executed, the processor 104 performs certain methods, as disclosed herein, and particularly as disclosed with respect to FIGS. 4A-4E.

Figure 4A:
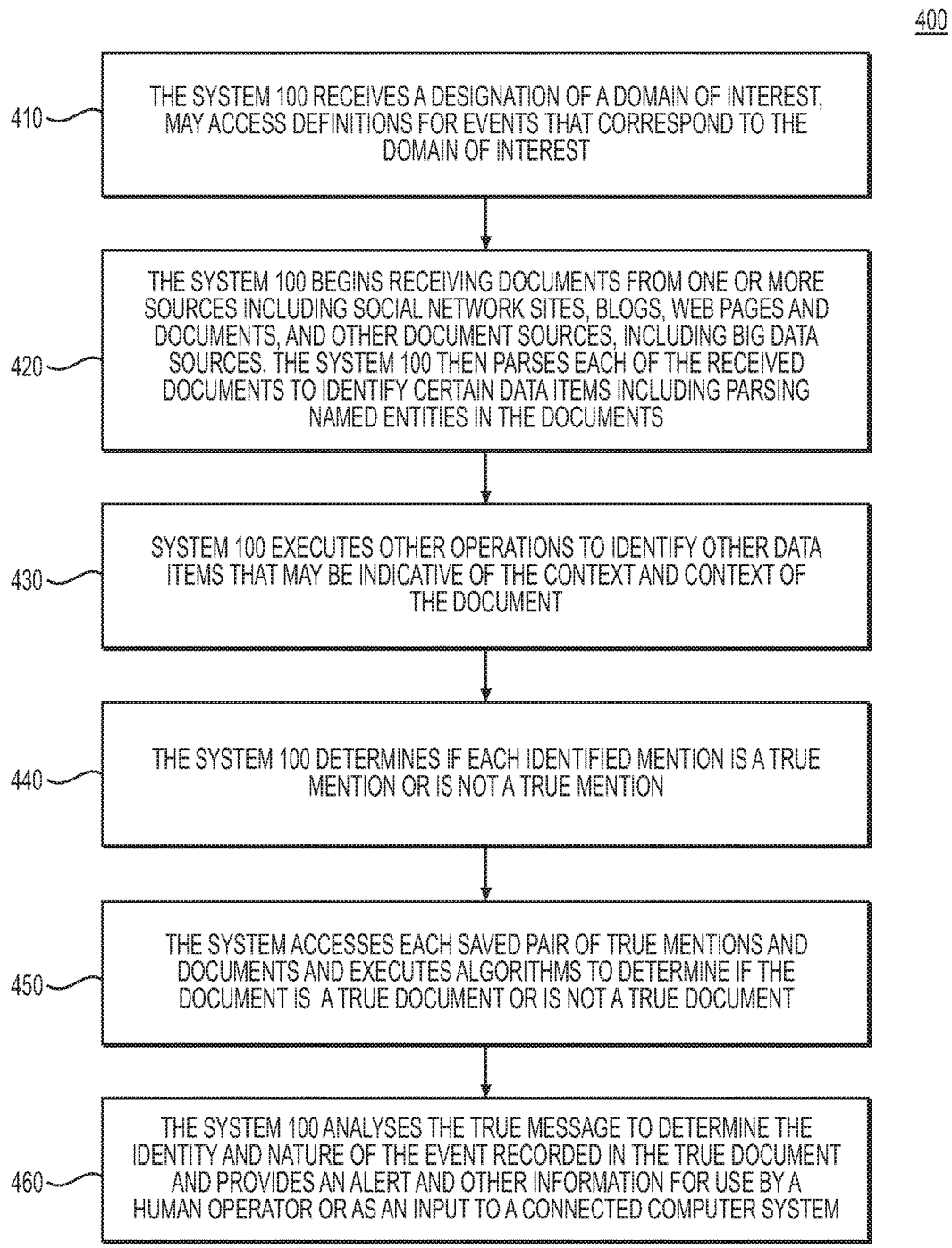
FIGS. 4A-4G illustrate example methods executed by the example community-based reporting and analysis systems of FIGS. 2A(1)-2A(3) and 3.

FIG. 4A illustrates method 400 in which community-based documents are accessed and evaluated to determine if any events within a specified category of events may be identified in a corpus of documents. Method 400 begins in block 410 when the system 100 receives a designation of a domain of interest—in an example, sUAS operations, and more specifically sUAS operations that resulted in one of a list of undesirable events including operation of a sUAS in a restricted airspace and operation that resulted in an interference with other aircraft. See FAA Pilot UAS Reports https://www.faa.gov/news/updates/?newsId=83544) for examples of such events. Note that the list includes reported events only. One function of the system 100 and associated method 400 is to find unreported examples of similar events. However, the unreported events found by the system 100 may subsequently correlate with reported events, and the system 100 may perform such correlations. The system 100 may access definitions for these two events at a government site, such as the Federal Aviation Agency (FAA) Web site, and may use the definitions to expand the domain of interest to include the definitions. Note that the expansion of the domain of interest may be accomplished without human intervention. The endpoint of the operation of block 410 is an authoritative list of events that the system 100 then uses as a guide to search and analyze the documents. Following block 410 operations, the method 400 moves to block 420.

In block 420, the system 100 begins receiving documents from one or more sources including social network sites, blogs, Web pages and documents, and other document sources, including big data sources. The system 100 may separate the documents based on header information in the documents (e.g., date and time, document source) and may process the separated documents using parallel processing streams. However, the separate processing streams may use the same data structures, such as the same named entity lists, for processing the documents. The system 100 then parses each of the received documents to identify certain data items including parsing named entities in the documents based on the named entity lists $158_i$ in the data store 150. Optionally, the system 100 may tweak one or more data items to provide a more accurate analysis of the content of the documents. Following block 420, the method 400 moves to block 430.

In block 430, the system 100 compares the parsed data items to the entity lists, after tweaking, if executed. The system 100 executes other operations to identify other data items that may be indicative of the context and context of the document. The execution of block 430 operations and algorithms results in one or more mentions in one or more of the documents. Following block 430, the method 400 moves to block 440.

In block 440, the system 100 determines if each identified mention is a true mention or is not a true mention. For example, the system 100 may classify an exact match between a mention and a named entity in a named entity list $158_i$. However, in some situations, the system 100 also may execute certain second order analyses before making the determination of a true mention. The system 100 may store all true mentions and corresponding document identifications as in the data store 150. Following block 440, the method 400 moves to block 450.

In block 450, the system 100 accesses each saved pair of true mentions and documents and executes algorithms to determine if the document is a true document or is not a true document. If in block 450, the system 100 determines the document is a true document, the method moves to block 460. Otherwise, the method 400 moves to block 420, and the processes of blocks 420-450 repeat.

In block 460, the system 100 analyses the true message to determine the identity and nature of the event recorded in the true document. If warranted by the identify and nature, the system 100 provides an alert and other information for use by a human operator or as an input to a connected computer system. Following block 460, the method 400 returns to block 420.

Figure 4B:
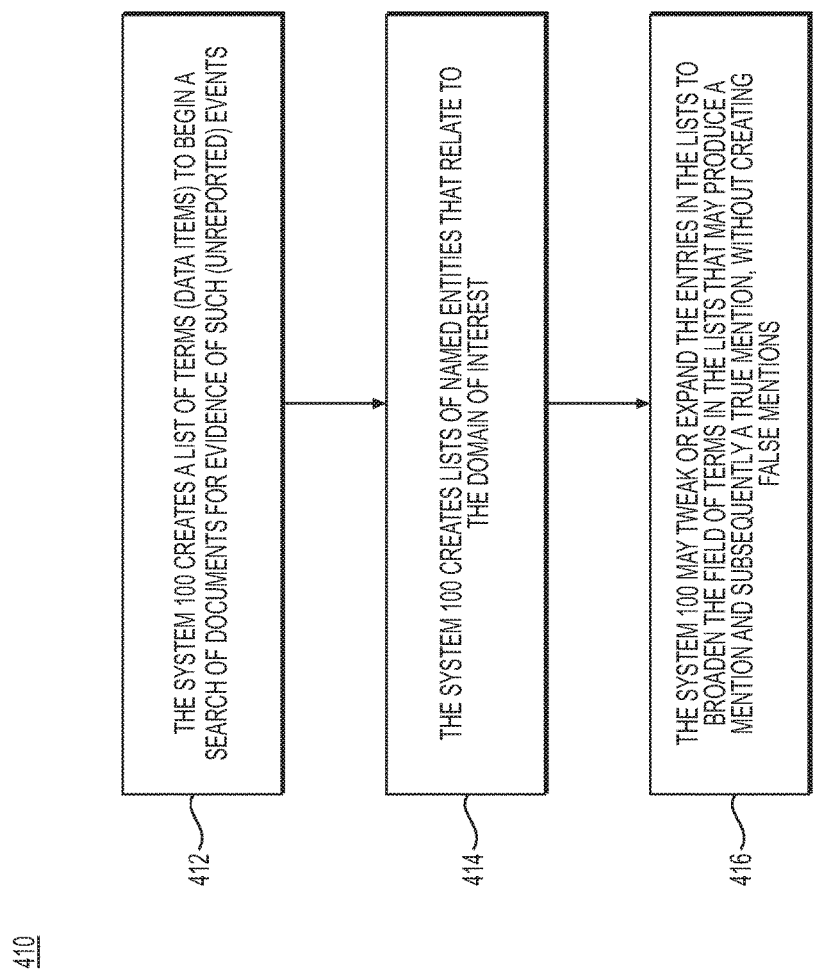

FIG. 4B illustrates the operation of block 410 in detail. Block 410 beings with designation of a domain of interest, for example, sUAS operations that would constitute a violation of FAA regulations; the designation may provide more specificity as to exactly what would constitute a violation, such as operation of a sUAS within one mile of an airport; and operation of a sUAS in curtained restricted airspaces, for example. The system 100 may be provided with this information by a human operator or the system 100 may extract specific parameters concerning unauthorized/dangerous sUAS operations from an electronic database, for example. In block 412, the system 100 creates a matrix or list of terms (data items) to begin a search of documents for evidence of such (unreported) events. The system 100 may store the terms in a data structure such as the data structures $158_i$ in data store 150. The data items may serve as inputs to a neural network or other heuristic that may be trained to identify documents that related to the domain of interest. In block 414, the system 100 creates lists of named entities that relate to the domain of interest. For example, the system 100 may create a list of all sUAS manufacturers worldwide, a list of their products, and lists of performance characteristics and designations of the products. The lists follow the structure of the data structures $158(i)$ and may be used by the system 100 to identify mentions in a document and subsequently classify the mentions as true or not true, and the corresponding documents as true or not true. In some embodiments, the method of block 410 may proceed to block 416, and the system 100 may tweak or expand the entries in the lists $158_i$. Note that the system 100 also may tweak or expand data items found in the documents. The purpose of the tweaking and expansion is to broaden the field of terms in the lists that may produce a mention and subsequently a true mention, without creating false mentions. Thus, for example, in block 416, "phantom 4" appearing in a named entity list 158$_i$ may be tweaked to "Phantom 4." As part of the operation of block 416, the system 100 may store 'Phantom 4" with a link to "phantom 4" to indicate execution of the tweak. Following optional block 416, the method 400 moves to block 420.

Figure 4C:
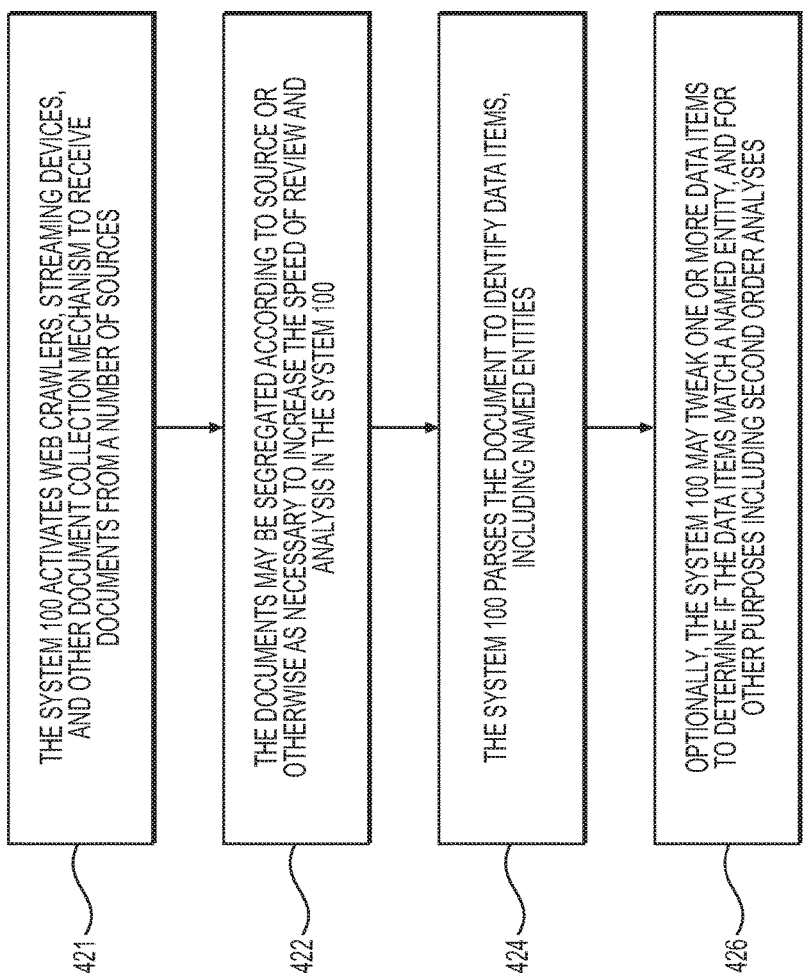

FIG. 4C shows operations of block 420 in detail. In FIG. 4C, the method 420 begins, block 421, with the system 100 activating Web crawlers, streaming devices, and other document collection mechanism to receive documents from a number of sources, including big data sources, such as publicly available social network sites, blogs, YouTube videos and comments, news articles, e-magazines and reports, and databases. The documents may be pushed to or pulled by the system 100. In block 422, the documents may be segregated according to source or otherwise as necessary to increase the speed of review and analysis in the system 100. To that end, the system 100 may employ multiple sites, systems, processors and data stores. In an embodiment, some of the processing capability and some of the data store capacity may reside in the cloud. However, in an embodiment, dispersed versions of the system 100 will refer to a consistent set of data structures (e.g., data structures 151, 158$_i$), either though replication of their content or centralization of the relevant data structures. Once a document is received, and segregated, in block 424, the system 100 parses the document to identify data items, including named entities. For example, the system 100 may parse a document to identify if any named entity in any of the lists 158$_i$ is found in the document, although at this step, the system 100 does not classify such a named entity as a mention; rather, the system 100 parses data items according to their presence as words, numbers, and similar items. For example, the named entity (see FIG. 1A(1)) "Phantom 4" may be parsed as "Phantom 4," 'Phantom," and "4". Ultimately, the system 100 will resolve these parsed data items as named entity 'Phantom 4". The system 100 also may parse data items according to parts-of-speech, proper nouns, and other classifications. The system 100 may determine proximity of named entities in a document to other named entities in the document. The system 100 may identify audio snippets and convert the audio to text using speech recognition algorithms, and then apply the above-described text analysis techniques to the translated audio. The system 100 may identify images (still or video) in the document for comparison to images in the lists 158$i$. If the video includes audio snippets, the system 100 may convert the audio to text. Optionally, in block 426, the system 100 may tweak one or more data items to determine if the data items match a named entity, and for other purposes including second order analyses. Following block 426, the method 400 moves to block 430.

Figure 4D:
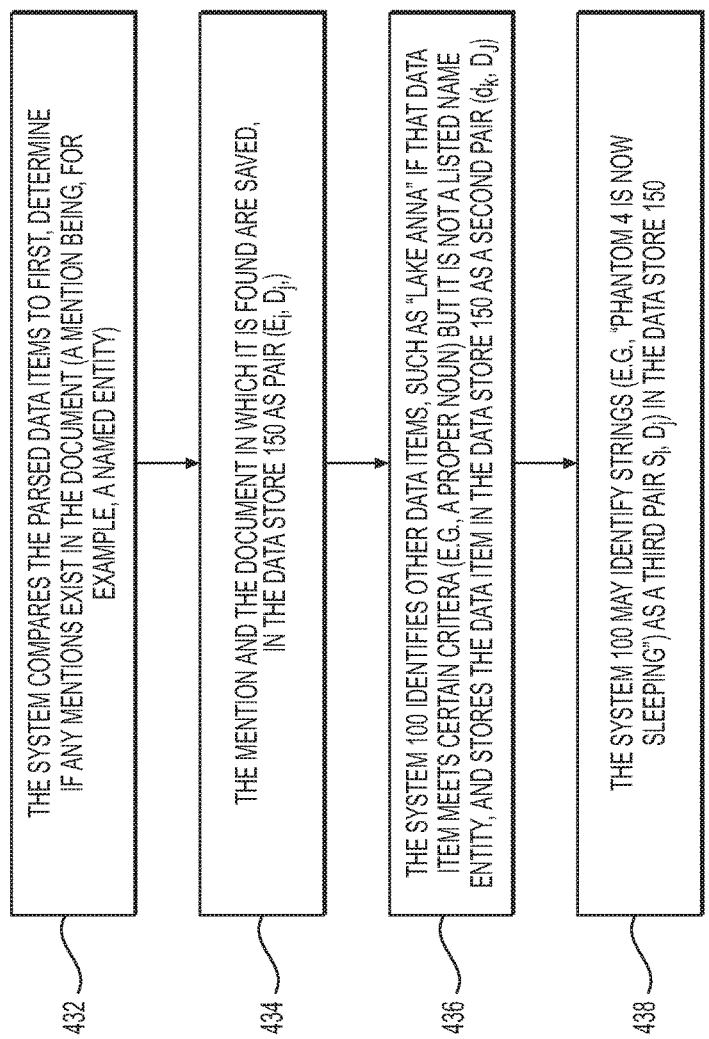

FIG. 4D shows operations of block 430 in detail. In FIG. 4D, the method 430 begins with the system 100 receiving parsed data items from a document. In block 432, the system 100 compares the parsed data items to first, determine if any mentions exist in the document (a mention being, for example, a named entity). However, at this point, a mention has not and is not designated as a true or not true mention. The mention and the document in which it is found are saved, block 434, in the data store 150 as pair (E$_i$, D$_j$). In block 436, the system 100 identifies other data items, such as "Lake Caroline" if that data item meets certain criteria (e.g., a proper noun) but is not a listed named entity, and stores the data item in the data store 150 as a second pair (d$_k$, D$_j$). Finally, in block 438, the system 100 may identify strings (e.g., "Phantom 4 is now sleeping") as a third pair (S$_l$, D$_j$) in the data store 150. Following block 438, the method moves to block 440.

Figure 4E:
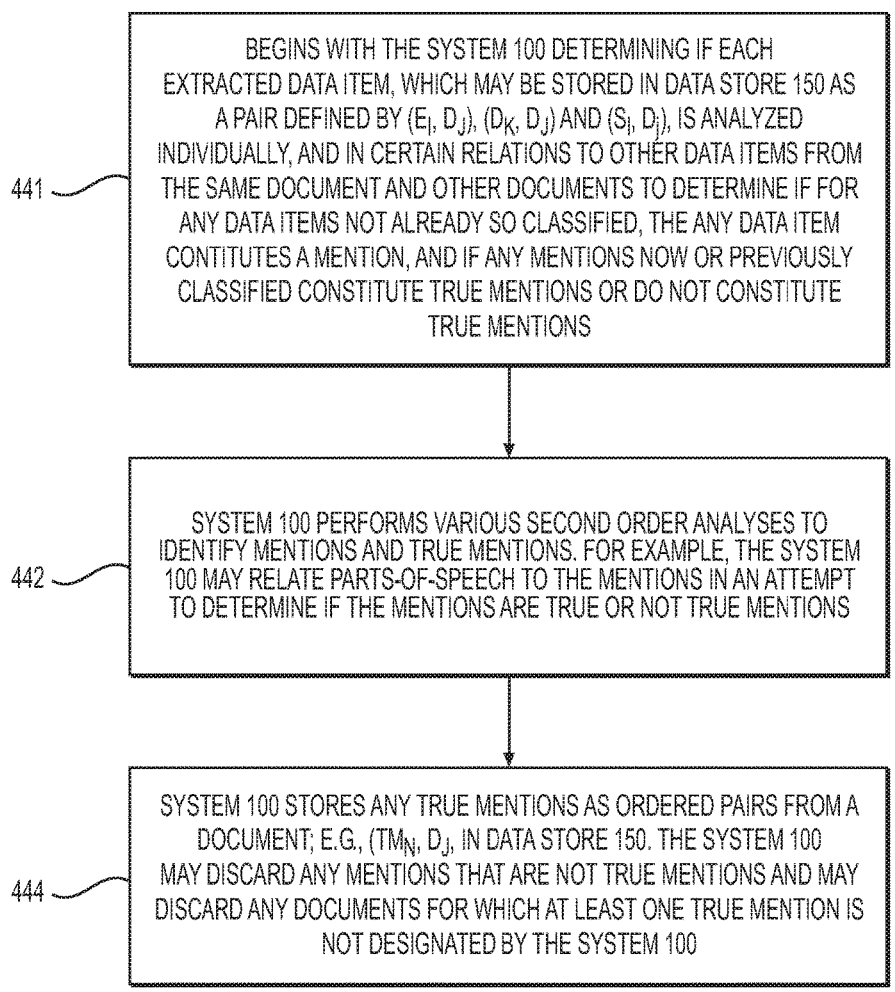

FIG. 4E shows operations of block 440 in detail. In FIG. 4E, the method 440 begins, block 441, with the system 100 determining if each extracted data item, which may be stored in data store 150 as a pair defined by (E$_i$, D$_j$), (d$_k$, D$_j$) and (S$_l$, D$_j$), is analyzed individually, and in certain relations to other data items from the same document and other documents to determine if for any data items not already so classified, the any data item constitutes a mention, and if any mentions now or previously classified constitute true mentions or do not constitute true mentions. The initial analysis may begin by comparing the data item to a list of named entities, which may produce a mention of a named entity, and then if any such mentions constitute true mentions of the named entity. A data item that is an exact match of a named entity derived from records that pertain to a domain of interest typically will be classified as true mentions. However, as noted above, some mentions that exactly match a named entity may not, in fact, because of the domain of interest and the context of the document, be true mentions. The mention "Phantom" may not be a true mention of a DJI quadcopter if the context of the document from which it is extracted is outside the expected context bounds for the domain of interest. Such a situation would arise if "Phantom" were used in a document related to the context of the Broadway play, "Phantom of the Opera." Thus, the named entity, which also is a string, "DJI Phantom 4" may be accurately classified as a named entity, a mention, and a true mention, the named entity "Phantom" may require more analysis before the system 100 classifies its appearance in a document as a true mention. After this initial analysis, the method of block 440 moves to block 442, and the system 100 performs various second order analyses to identify mentions and true mentions. For example, the system 100 may relate parts-of-speech to the mentions in an attempt to determine if the mentions are true or not true mentions. In block 444, the system 100 stores any true mentions as ordered pairs from a document; e.g., (TM$_n$, D$_j$) in data store 150. The system 100 may discard any mentions that are not true mentions and may discard any documents for which at least one true mention is not designated by the system 100. Following block 444, the method 400 moves to block 450.

Figure 4F:
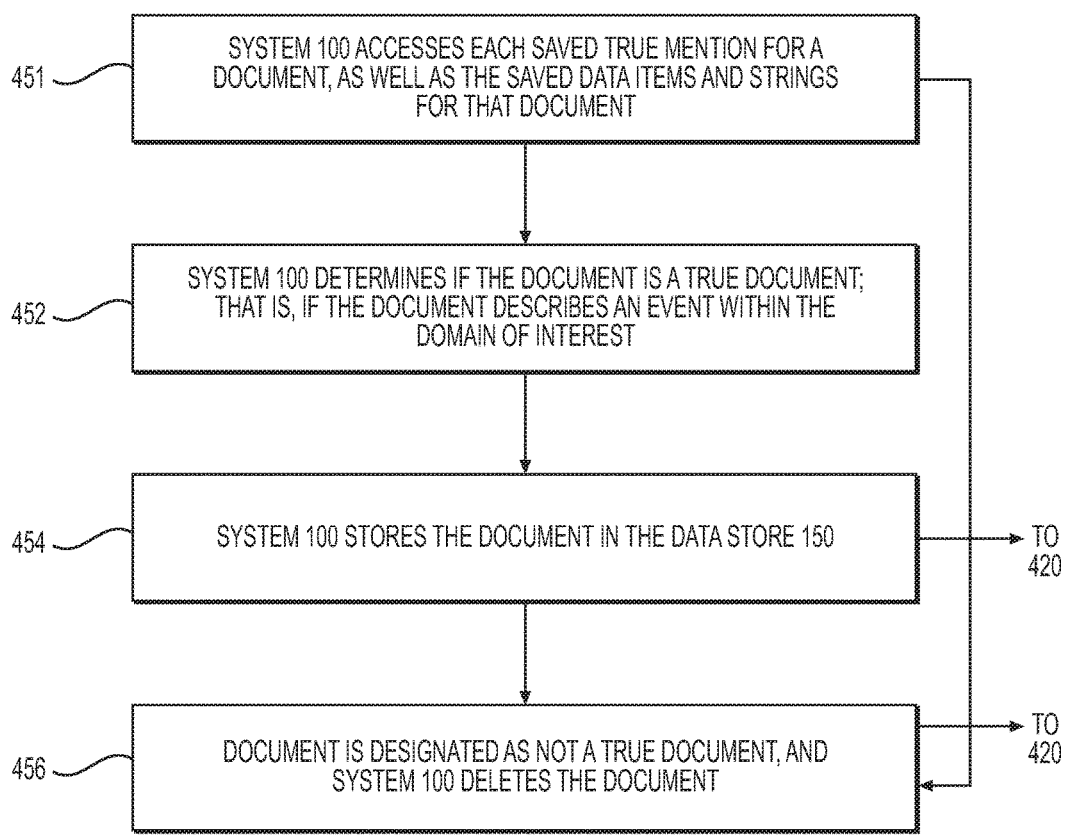
Figure 4G:
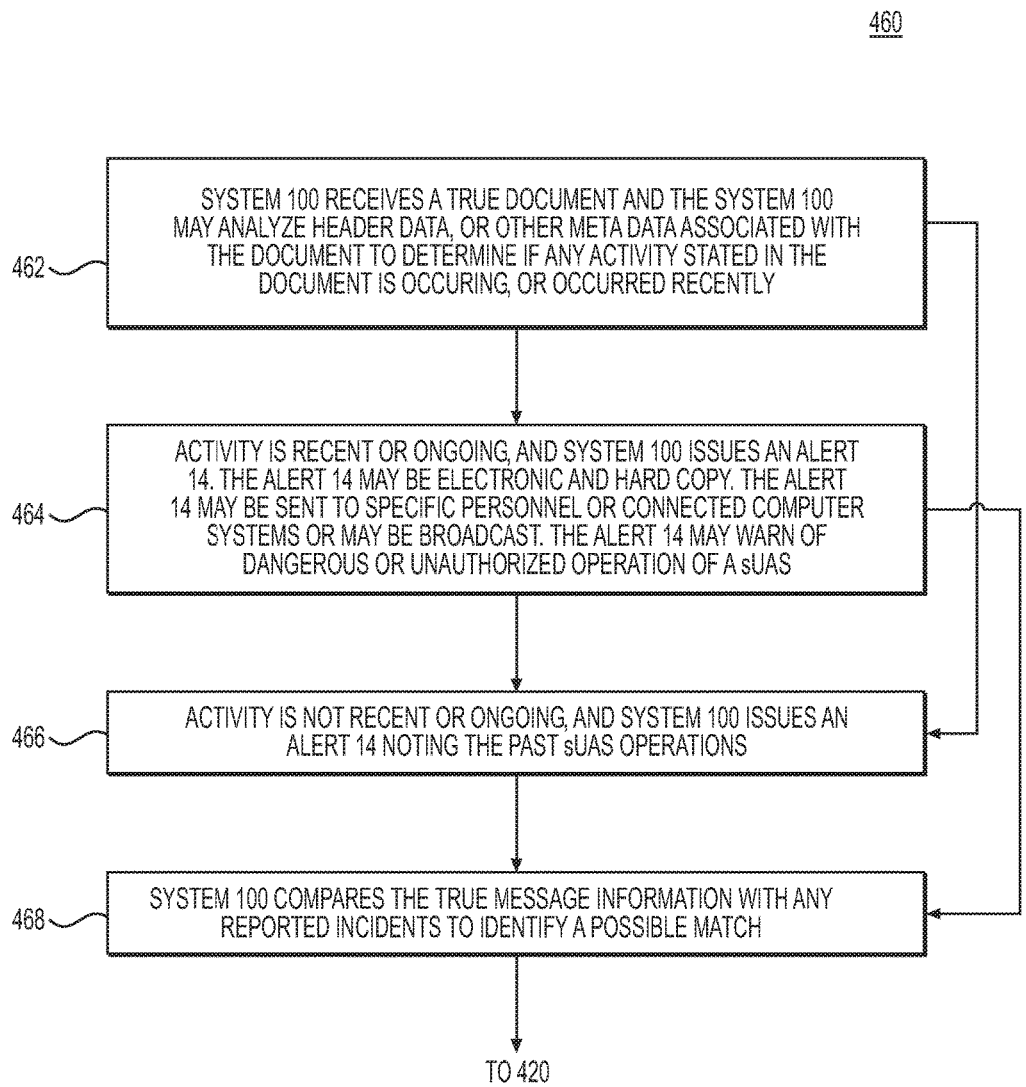

FIG. 4F shows operations of block 450 in detail. In FIG. 4G, the method 450 begins, block 451, with the system 100 accessing each saved true mention for a document, as well as the saved data items and strings for that document. In block 452, the system 100 determines if the document is a true document; that is, if the document describes an event within the domain of interest. For example, a SNS message stating that the poster just bought a new Phantom 4 quadcopter, and nothing related to unauthorized or dangerous sUAS operations, would not be a true document if the domain of interest is dangerous or unauthorized sUAS operations. Thus, in block 452, the system 100 examines not only any true mentions from the document but also other data items, strings, other true mentions in the same or related documents (two documents are related if, for example, one is a reply to the other). The other data items and the strings may indicate that a true mention of a Phantom 4 drone in conjunction with the data items and strings results in the document being in the domain of interest and hence is a true document. As an example, a SNS message (i.e., a document) may state the poster was flying a Phantom 4 drone and the SNS message may include as an image, a photograph of RFK Stadium in Washington D.C. taken by a camera mounted on the drone. Logic executed by the system 100 then may classify the SNS message as a true message based on the drone possibly operating in restricted airspace around Washington D.C. Following designating a document as a true document, in block 454 the system 100 stores the document in the data store 150. Following block 454, the method moves to block 460. However, if the document is designate as not a true document, in block 456, the system 100 deletes the document and following block 456, the method returns to block 420.

FIG. 4G shows operations of block 460 in detail. In FIG. 4G, the method 460 begins with the system 100 receiving a true document. In block 462, the system 100 may analyze header data, or other meta data associated with the document to determine if any activity stated in the document is occurring, or occurred recently. If the activity is ongoing or recent, the method 460 moves to block 464 and the system 100 issues an alert 14. The alert 14 may be electronic and hard copy. The alert 14 may be sent to specific personnel or connected computer systems or may be broadcast. The alert 14 may warn of dangerous or unauthorized operation of a sUAS. If in block 462, the activity is not recent or ongoing, the method 460 moves to block 466 and the system 100 issues an alert 14 noting the past sUAS operations. Following either block 464 or 466, the method 460 moves to block 468 and the system 100 compares the true message information with any reported incidents to identify a possible match. For example, an actual report from the FAA data base states "PRELIM INFO FROM FAA OPS: WASHINGTON, DC/UAS/1404E/CITIZEN REPORTED OBSERVING A UAS VCNTY OF NAVAL YARD, 1.4 ENE DCA. CITIZEN MADE REPORT TO WASHINGTON METRO PD. NO INFO ON TYPE OR DESCRIPTION." The system 100 may correlate the true message with the actual report and provide a notification to appropriate personnel or to a connected computer system. Following block 468, the method 400 returns to block 420.

Certain of the devices shown in FIGS. 2A(1)-3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 4A-4G. The disclosed devices, components, and systems contemplate using or implementing any suitable technique for performing the steps illustrated. Thus, FIGS. 4A-4G are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A community-based reporting and analysis system comprising a program of instructions stored on a non-transitory computer-readable storage medium, wherein when executed, the program of instructions cause a processor to:
- generate a domain of interest;
- based on the domain of interest, identify known terms in one or more resources, the known terms corresponding to named entities, wherein, for one or more known terms, the processor:
  - tweaks one or more known terms to produce an expanded list of known terms, each tweaked known term in the expanded list of known terms corresponding to the named entity, and
  - stores the known terms and the expanded list of known terms with a link from the expanded list of known terms to an original known term;
- use the known terms to train a neural network by iteratively applying the known terms to an input layer of the neural network and reading an output of an output layer of the neural network;
- receive a document related to the domain of interest;
- apply a natural language processing system to parse the document to identify one or more data items in the document;
- apply the parsed document to the trained neural network, thereby causing the neural network to:
  - extract one or more of the identified data items from the parsed document, comprising the neural network:
    - applying a data item to a series of layers of the neural network; and
    - providing an output to the processor,
- determine that the data item comprises a true mention of a named entity based on the output, wherein the processor determines that the data item is a true mention when the neural network output indicates the data item matches exactly a known term in a list of named entities;
- analyze circumstances in which the true mention of the named entity appears in the parsed document; and
- determine, based on the analyzed characteristics, that the document is a true document.

2. The community-based reporting and analysis system of claim 1,
- wherein the processor uses the tweaked known terms to train the neural network by iteratively applying each of the tweaked known terms to an input layer of the neural network and reading an output of an output layer of the neural network; and
- wherein the processor generates the domain of interest comprises the processor performing one or more of:
  - receiving predefined events,
  - executing the natural language processor to search the document to identify specific words, terms, and other data elements using named entity recognition, and
  - executing a Web crawler to search for occurrences of the known terms using named entity recognition.

3. The community-based reporting and analysis system of claim 2, wherein, for one or more tweaked known terms, wherein the processor, using the natural language processing system:
- applies to the document, one or more tweaked known terms of the expanded list of known terms;
- follows the link to the original known term to verify the tweaked known term from the expanded list of known terms corresponds to the original known term; and
- based on the correspondence, further verifies that the data item is a true mention of the known term.

4. The community-based reporting and analysis system of claim 1, wherein the processor causes an alert to issue when a document is classified as a true document.

5. The community-based reporting and analysis system of claim 1, wherein the document comprises unstructured and semi-structured data.

6. The community-based reporting and analysis system of claim 1, wherein the processor determines if the mention is a true mention when the mention matches approximately a known term in a list of named entities.

7. The community-based reporting and analysis system of claim 1, wherein the processor analyzing the context of the true mention of the named entity in the document comprises the processor comparing the context of the true mention of the named entity in the document with the domain of interest.

8. The community-based reporting and analysis system of claim 1, wherein the document comprises image data item comprising image data of an image, and wherein the processor:
- obtains a particular pattern of pixels within the image;
- compares the pixel pattern to an object stored in memory of the system; and
- classifies the data item comprising image data as a true mention based on the comparison.

9. The community-based reporting and analysis system of claim 1, wherein the document comprises one or more of social network site (SNS) messages, short message service messages, and instant messenger messages.

10. A computer-implemented method for analyzing documents, comprising:
- a processor receiving one or more documents, from a community-based document delivery system, related to a domain of interest;
- the processor identifying and extracting one or more data items from a document of the one or more documents, comprising the processor:
- accessing one or more lists of known terms, the lists relevant to the domain of interest, and
- applying a natural language processing system to identify a data item in the document based on an exact match of the data item to a known term in a list of known terms;
- the processor determining if an identified and extracted data item comprises a true mention of a known term, comprising:
  - applying the identified and extracted data item to a trained neural network, causing the trained neural network to:
    - apply the identified and extracted data item to a plurality of weighted layers; and
    - produce an output indicating the data item is an exact match of a known term, wherein the known term is a named entity, and
  - saving the known term with a relation to the document as a true mention comprising a known term, document pair;
- analyzing circumstances of the true mention of the known term in the document; and
- determining, based on the analyzed circumstances, that the document is a true document.

11. The method of claim 10, wherein the processor receives a statement of the domain of interest, and based on the statement, identifies known terms in one or more resources, the known terms corresponding to named entities, and wherein the processor, in determining the true mention of identifies the known term as a named entity.

12. The method of claim 10, wherein, for one or more known terms, the processor:
- tweaks the one or more known terms to produce an expanded list of known terms, each tweaked known term in the expanded list of known terms corresponding to an original known term; and
- stores the tweaked known terms as the expanded list of known terms with a link from the list of expanded known terms to the original known term, and wherein the processor:
- applies to the document, one or more tweaked known terms of the expanded list of known terms;
- follows the link to the original known term to verify the tweaked known term from the expanded list of known terms corresponds to the original known term; and
- based on the correspondence, further verifies that the data item is a true mention of the known term.

13. The method of claim 10, wherein the processor causes an alert to issue when the document is classified as a true document.

14. The method of claim 10, wherein the comprises unstructured and semi-structured data.

15. The method of claim 10, wherein the document comprises image data item comprising image data of an image, and wherein the processor:
- obtains a particular pattern of pixels within the image;
- compares the pixel pattern to an object stored in memory of the system; and
- classifies the data item comprising image data as a true mention based on the comparison.

16. The method of claim 10, wherein the processor analyzing the context of the true mention of the named entity in the document comprises the processor comparing the context of the true mention of the named entity in the document with the domain of interest.

17. The method of claim 10, further comprising the processor initiating an alert when the document is determined to be a true document, and wherein the processor further analyzes the data items to:
- determine part-of-speech information, proper names, and strings, and to determine the relevance, meaning, and use of such data items;
- identify data items, including header data and metadata, indicative of activity related to the domain of interest; and
- determine the activity is currently occurring or recent, wherein the processor issues the alert as including the activity is ongoing or recent.

18. A system comprising a program of instructions stored on a non-transitory, computer-readable storage medium, wherein execution of the program of instructions cause a processor to:
- acquire documents related to a specified domain of interest;
- process the acquired documents to identify one or more data items;
- analyze the identified one or more data items to determine that at least one of the data items comprises a true mention of a named entity, comprising:
  - applying a data item to a trained neural network,
  - receiving an output of the neural network indicating that a probability that the data item is an exact match of the named entity is greater than a threshold probability level;
- store the data item, as a true mention of the named entity, in association with the document as a data item-document pair;
- determine the document corresponds to a true document by:
  - analyzing circumstances of the appearance of the true mention in the document, and
  - determining the circumstances match an expected use of the true mention of the named entity in the document.

19. The system of claim 18, wherein in determining the document corresponds to a true document, the processor:
- compares the document to other true documents;
- identifies true mentions in the other true documents; and
- determines use of the identified true mentions in the other true documents matches use of the true mention in the document.

20. The system of claim 18, wherein the processor further analyzes the data items to:
- determine part-of-speech information, proper names, and strings, and to determine the relevance, meaning, and use of such data items;
- identify data items, including header data and metadata, indicative of activity related to the domain of interest; and
- determine the activity is currently occurring or recent, and the processor issues an alert including the activity is ongoing or recent.

* * * * *